(12) United States Patent
Falter et al.

(10) Patent No.: US 10,768,148 B2
(45) Date of Patent: Sep. 8, 2020

(54) METHOD FOR DETECTING FLAW IN TRAIN WHEEL WITH SINGLE ULTRASONIC PULSE AND TESTING DEVICE THEREFOR

(71) Applicant: GE Sensing & Inspection Technologies GmbH, Hurth (DE)

(72) Inventors: Stephan Falter, Huerth (DE); Luca Scaccabarozzi, Huerth (DE)

(73) Assignee: GE Sensing & Inspection Technologies, GmbH, Hurth (DE)

( * ) Notice: Subject to any disclaimer, the term of this patent is extended or adjusted under 35 U.S.C. 154(b) by 224 days.

(21) Appl. No.: 15/536,816

(22) PCT Filed: Dec. 9, 2015

(86) PCT No.: PCT/EP2015/079173
§ 371 (c)(1),
(2) Date: Jun. 16, 2017

(87) PCT Pub. No.: WO2016/096578
PCT Pub. Date: Jun. 23, 2016

(65) Prior Publication Data
US 2018/0017532 A1    Jan. 18, 2018

(30) Foreign Application Priority Data

Dec. 18, 2014 (DE) .................. 10 2014 119 056

(51) Int. Cl.
*G01N 29/04*        (2006.01)
*G01N 29/27*        (2006.01)
(Continued)

(52) U.S. Cl.
CPC .......... *G01N 29/262* (2013.01); *G01M 17/10* (2013.01); *G01N 29/043* (2013.01); *G01N 29/27* (2013.01);
(Continued)

(58) Field of Classification Search
CPC ............. G01S 15/8911; G01S 15/8915; G01S 15/8993; G01N 29/043; G01N 29/262;
(Continued)

(56) References Cited

U.S. PATENT DOCUMENTS 4,543,828 A    10/1985   Lerch
5,349,861 A *   9/1994   Catot ................... G01N 29/07
                                                     73/598
(Continued)

FOREIGN PATENT DOCUMENTS

DE    3 236 218 A1    4/1984
DE    32 36 218 A1    4/1984
(Continued)

OTHER PUBLICATIONS

Machine Translation and Search Report and Opinion issued in connection with corresponding DE Application No. 102014119056.4 dated Sep. 9, 2015.
(Continued)

*Primary Examiner* — Jacques M Saint Surin
(74) *Attorney, Agent, or Firm* — Mintz Levin Cohn Ferris Glovsky and Popeo, P.C.

(57) ABSTRACT

The invention relates to a method for testing of a train wheel by ultrasound. The method is based on a pulsed ultrasonic field in the train wheel to be tested by an array of individually controllable ultrasonic transmitting transducers acoustically coupled to the train wheel each controlled with a specific analog transient excitation signal. Each analog transient excitation signal generated based on an ultrasonic transmitting transducer-specific stored digital transient excitation function. The resulting echo signals from the train wheel to be tested are recorded by an array of individually controllable ultrasonic receiving transducers. Each ultrasonic receiving transducer can provide an analog, time-
(Continued)

resolved echo signal. The received echo signals can be digitized in a transducer-specific way and stored in a set. A plurality of different reception processing rules can then be applied to the latter. Furthermore, the invention relates to a device for carrying out the method.

27 Claims, 15 Drawing Sheets

(51) Int. Cl.
G01S 15/89 (2006.01)
G10K 11/34 (2006.01)
G01M 17/10 (2006.01)
G01N 29/26 (2006.01)

(52) U.S. Cl.
CPC ....... *G01S 15/8911* (2013.01); *G01S 15/8915* (2013.01); *G10K 11/341* (2013.01); *G01N 2291/044* (2013.01); *G01N 2291/106* (2013.01); *G01N 2291/2696* (2013.01); *G01S 15/8993* (2013.01)

(58) Field of Classification Search
CPC ............ G01N 29/27; G01N 2291/044; G01N 2291/106; G01N 2291/2696; G10K 11/341
USPC .......................................................... 73/602
See application file for complete search history.

(56) References Cited

U.S. PATENT DOCUMENTS

| | | | |
|---|---|---|---|
| 6,347,550 B1* | 2/2002 | Kroening | B61K 9/12 73/598 |
| 6,469,957 B1* | 10/2002 | Savord | G01N 29/346 367/137 |
| 7,429,352 B2 | 9/2008 | Bisiaux et al. | |
| 7,555,954 B2* | 7/2009 | Pagano | G01N 29/043 73/620 |
| 7,832,288 B2* | 11/2010 | Caretta | G01L 5/16 73/862.046 |
| 7,926,350 B2 | 4/2011 | Kröning et al. | |
| 8,147,409 B2* | 4/2012 | Shifrin | G01S 7/52046 600/407 |
| 8,771,333 B2* | 7/2014 | Rincon | A61F 2/07 623/1.11 |
| 9,639,056 B2 | 5/2017 | Falter et al. | |
| 2006/0254359 A1 | 11/2006 | Langlois et al. | |
| 2011/0126626 A1* | 6/2011 | Koch | G01N 29/07 73/632 |
| 2014/0211588 A1 | 7/2014 | Falter et al. | |
| 2015/0330948 A1 | 11/2015 | Lingenberg | |
| 2017/0219536 A1 | 8/2017 | Koch et al. | |

FOREIGN PATENT DOCUMENTS

| | | |
|---|---|---|
| DE | 19 943 215 A1 | 4/2001 |
| DE | 10 2005 051 781 A1 | 5/2007 |
| DE | 10 2012 112 121 A1 | 6/2014 |
| DE | 10 2013 106 901 A1 | 1/2015 |
| DE | 10 2014 107 819 A1 | 1/2016 |
| EP | 0 114 595 A1 | 8/1984 |
| EP | 0 114 595 A2 | 8/1984 |
| EP | 1 087 229 A2 | 3/2001 |
| EP | 1 101 105 A1 | 5/2001 |
| EP | 1 454 132 A1 | 9/2004 |
| EP | 2 294 400 A2 | 3/2011 |
| EP | 2 759 817 A1 | 7/2014 |
| FR | 2 833 706 A1 | 6/2003 |
| WO | WO 2000008459 * | 2/2000 |
| WO | 2009/150066 A1 | 12/2009 |
| WO | 2009/150067 A2 | 12/2009 |

OTHER PUBLICATIONS

International Search Report and Written Opinion issued in connection with corresponding PCT Application No. PCT/EP2015/079173 dated Mar. 16, 2016.

International Preliminary Report on Patentability issued in connection with corresponding PCT Application No. PCT/EP2015/079173 dated Jun. 20, 2017.

Office Action issued in connection with corresponding EP Application No. 15807908.7 dated Jan. 28, 2019.

* cited by examiner

| C1 | C2 | C3 | C4 | C5 | OUTPUT |
|----|----|----|----|----|--------|
| 1  | 0  | 0  | 0  | 0  | +V1    |
| 0  | 1  | 0  | 0  | 0  | +V2    |
| 0  | 0  | 1  | 0  | 0  | -V1    |
| 0  | 0  | 0  | 1  | 0  | -V2    |
| 0  | 0  | 0  | 0  | 1  | GROUND |

METHOD FOR DETECTING FLAW IN TRAIN WHEEL WITH SINGLE ULTRASONIC PULSE AND TESTING DEVICE THEREFOR

BACKGROUND TO THE INVENTION

The present invention relates to a method for the non-destructive testing of a train wheel by means of ultrasound, in particular to a method for the detection of a flaw such as a crack in a region of interest in a train wheel that is rotatable about an axis of rotation. A further subject matter of the present invention is a testing device for the detection of a flaw such as a crack in a region of interest in a train wheel.

A variety of devices and methods for the non-destructive testing of the volume of a test object, such as a train wheel, by means of ultrasound are known according to the prior art. In particular since the introduction of the so-called phased array technique, which is based on the use of a plurality of independently controllable ultrasonic transducers and which permits a specific control of the insonification angle and the focus position of the generated ultrasonic field in the test object by variation of the transmission aperture and the relative phase position of the transmitting transducer elements, a largely automated ultrasound-based material testing, directly in the production process, for example of train wheels, is possible. Generally, pulsed ultrasonic fields are used here, which have a typical repetition rate of a few hundred to a few thousand Hertz and in which the insonified ultrasonic pulses have a center frequency of typically one to about 10 Megahertz.

In connection with the non-destructive testing of train wheels by means of ultrasound, reference is to be made to EP 1 101 105 A1, from which testing methods and devices for train wheels are known that are based on ultrasound and that use the phased array technique. A method is disclosed for detecting a crack in a train wheel which is rotatable about an axis of rotation, wherein an ultrasonic transducer provided for insonifying a first ultrasonic wave is moved relative to the train wheel in a substantially circular manner about the axis of rotation, and wherein the first ultrasonic wave is insonified into the train wheel through the running surface.

Furthermore, another method is disclosed for detecting a crack in a train wheel which is rotatable about an axis of rotation, wherein an ultrasonic transducer provided for insonifying a first ultrasonic wave is moved relative to the train wheel in a substantially circular manner about the axis of rotation, and wherein the first ultrasonic wave is insonified into the hub of the train wheel. Furthermore, devices for carrying out the above-mentioned methods are known from this publication. Here, the phased array technology is used primarily in order to pivot a directed sound beam for sequentially scanning a region of the train wheel to be inspected. Furthermore, the use is disclosed of two-dimensional arrays of ultrasonic transducers, in order to be able to control angular swiveling and focusing in two directions in space orthogonal to each other.

A method for the detection of a flaw in a disk-like or plate-like test object, particularly in a train wheel, is also known. In the test object, an ultrasonic wave that is polarized transversally and parallel to the flat side of the test object is generated on a narrow side of the test object by means of an ultrasonic transmitter and detected after the deflection on the flaw by an ultrasonic receiver spaced from the ultrasonic transmitter. More particularly, the insonification angle of the ultrasonic wave in the test object has a value greater than 10° and less than the refraction angle, which is associated with the first critical angle, of the material from which the train wheel is made. Furthermore, the received signal of the ultrasonic receiver is more particularly evaluated only within a time interval including the time of reception of the ultrasonic wave that is to be expected for the spacing between the ultrasonic transmitter and the ultrasonic receiver and for the insonification angle. The document further discloses a device for carrying out the method.

Regarding the testing tasks for the non-destructive testing of train wheels known to the person skilled in the art from the prior art, reference is made to the entire content of the disclosure of the above-mentioned documents and to the publications regarding the relevant prior art mentioned in these documents. Furthermore, reference is made to the pertinent testing standards, such as, for example, ISO 5948 Railway rolling stock material—Ultrasonic acceptance testing or the internal testing guidelines of Deutsche Bahn No. 907.0403 Zerstörungsfreie Prüfung; Ultraschallprüfung von Radreifen BA 064/065 auf Querrisse in der Bohrungsfläche and der Lauffläche and No. 907.0405 Zerstörungsfreie Prüfung; Ultraschallprüfung der Radkranze von Vollrädern scheibengebremster Radsätze. The content of the disclosure of these prior publications is added in its entirety to the content of the disclosure of the present application by this reference.

Even though the methods and devices known have, by all means, proved their worth in practice in the largely automated testing of train wheels, it was found nevertheless that the time required for the testing is very considerable. It leads to longer downtimes of the rail vehicles to be tested, and thus to considerable financial losses of the operator.

BRIEF DESCRIPTION OF THE INVENTION

Embodiments of the present invention is therefore based on the object of further developing the above-mentioned methods and devices in such a way that they enable a significantly accelerated completion of the underlying testing task.

In an embodiment, the method is based on a development of the methods known from the prior art, which are based on the insonification of a directed, pulsed ultrasonic field into a train wheel to be tested, whose insonification direction is varied from pulse to pulse, for example, in order to sequentially scan a region of interest, e.g. the end surface of the wheel disk or the neck-like transitional region between the wheel rim and the wheel disk.

According to embodiments of the invention, a pulsed ultrasonic field is insonified in a targeted manner into a train wheel to be tested by means of an array of individually controllable ultrasonic transmitting transducers, using suitable beam generation techniques. With regard to its geometry, the ultrasonic field is adapted to the geometry of the train wheel to be tested and to the testing task to be carried out. In particular, this ultrasonic field is adapted to a "region of interest" to be examined within the context of the testing task to be carried out. Such a region of interest may be, in particular, such regions of the train wheel to be tested in which flaws, such as cracks, that are subject to registration because they are safety-relevant can occur with an increased probability in practical operation. However, the testing task may also relate to the testing of newly fabricated train wheels for freedom from flaws.

According to embodiments of the invention, the methods known from the prior art are being developed with respect to transmission, with techniques being used in this case that have become known under the name "ultrasonic holography". They are based on the insight that it is possible to predefine, at any point in the volume of the train wheel, an ultrasonic field with a desired ultrasonic field geometry, and to reckon back from this ultrasonic field geometry the ultrasonic field distribution in time and space at the location of an array of ultrasonic transmitting transducers. If the array of ultrasonic transmitting transducers emits this distribution in time and space of ultrasonic signals into the region of interest of a train wheel to be tested, then this results in the predefined ultrasonic field distribution desired at the observed point in the volume of the train wheel. It is thus possible to specifically generate field distributions of the ultrasonic field insonified into the region of interest of the train wheel to be tested, which are optimally suitable for the transsonification of the volume regions of the train wheel to be examined. In particular, this makes it possible to control the ultrasonic transmitting transducers in such a way that a line-like focus of the insonified ultrasonic field forms in the region of interest, or also a two-dimensionally extending focus extending along the sound propagation direction of the ultrasonic field. Transferred to the testing task, for example, an ultrasonic field with a line-like focus, which is situated on the end face of a wheel disk, can be generated in this way, so that the near-surface region of interest in the wheel disk located there can be tested for flaws simultaneously along a testing direction extending in the radial direction. Thus, it becomes unnecessary, in the V-shaped test setup, to tune the insonification or receiving angle in order to sequentially scan the entire inner surface of the wheel disk. This approach explained here by way of example can be transferred to virtually all testing tasks on the train wheel realized, in accordance with the prior art, with a sequential testing with an angular adjustment. The person skilled in the art can gather other examples for such testing tasks and the testing standards and guidelines mentioned in the introduction.

In addition, multiple echoes and crosstalk between different regions of the insonified ultrasonic field can be suppressed by skilled selection of the field geometry.

Therefore, the method according to embodiments of the invention permits transsonifying large sectors of the train wheel to be tested with a single ultrasonic pulse so effectively that echo signals can be received from them in principle. Therefore, fewer ultrasonic pulses are required than in the methods known from the prior art in order to transsonify the entire volume of the train wheel to be examined. For this reason, significantly increased testing speeds can be realized with the method according to embodiments of the invention and the testing device according to embodiments of the invention.

The method according to embodiments of the invention serves for the non-destructive testing of a train wheel by means of ultrasound. Within the context of the method, in a first step, a pulsed ultrasonic field is generated in the train wheel to be tested. An array of individually controllable ultrasonic transmitting transducers acoustically coupled to the train wheel is used for this purpose. The ultrasonic transmitting transducers are each controlled with a specific analog transient excitation signal, each analog transient excitation signal being generated based on an ultrasonic transmitting transducer-specific stored digital transient excitation function. The transient excitation functions to be used are generally numerically determined in a previous step, based on the geometry of the train wheel to be examined, as well as on the specific testing task, in this case particularly the position and orientation of the regions of interest to be examined in the train wheel.

In another method step, the resulting echo signals are received from the train wheel. An array of individually controllable ultrasonic receiving transducers can be used also for this purpose, with each ultrasonic receiving transducer providing an analog time-resolved echo signal. In particular, the ultrasonic transmitting transducers can also be used as receiving transducers, so that one and the same array of ultrasonic transducers can be used both for emitting the ultrasonic pulses as well as for receiving ultrasonic echoes.

Then, the analog echo signals that were received in a time-resolved manner are digitized in a transducer-specific way, with the time-resolved, transducer-specific, digitized echo signals more particularly being temporarily stored in the form of an echo signal set.

In a subsequent method step of a further development of the method according to embodiments of the invention, a plurality of different reception processing rules is then applied to this temporarily stored echo signal set, which is correlated with a single ultrasonic pulse insonified into the train wheel. In this case, a reception processing rule is characterized by at least the following reception processing parameters: the number and identity of the ultrasonic receiving transducers whose echo signals are being taken into account in the reception processing rule, individual phase shifts applied to the echo signals taken into account in the reception processing rule, and, if applicable, time frames in which the echo signals lie that are to be taken into account in the reception processing rule.

The reception processing rule can in this case be applied in parallel or also sequentially. Very high processing speeds can be realized particularly in the case of a parallel application. It is possible in principle to complete the application of the different reception processing rules to the echo signal set before the next ultrasonic pulse is insonified into the train wheel.

Advanced ultrasound-based inspection methods from the field of non-destructive material testing, for instance, are based on the further development of the concept that the evaluation of the ultrasonic echo signals recorded by means of an array of receiving transducers in a time-resolved manner from the volume of a test object are stored for each individual transducer in a desired depth as regards time and are then subjected to a processing algorithm. This processing algorithm can be configured to be totally independent of the insonifying algorithm used. For example, insonification can take place, for example, by means of a largely plane wave front, so that as large a test object volume as possible is transsonified. These stored echo signals of the individual receiving transducers can therefore basically stem from the entire transsonified test object volume. By specifically applying phase shifts between the transducer-specific echo signals it is now possible to synthetically focus the ultrasonic echo in such a manner that all echo signals that are associated with a certain depth region in the test object or a certain volume element (voxel) in the test object volume are specifically added up. By means of a specific variation of the phase position within the context of a repeated application of the evaluation algorithm to one and the same set of echo signals correlated to an individual insonified ultrasonic pulse, it is possible to scan, only by computation, the transsonified volume region by region and to generate in this manner a two- or three-dimensional image of the echo amplitudes stemming from the various volume regions of the test object. In this case, the family of FR 2 833 706 A1 has as its subject matter a method for the non-destructive testing of pipes by means of ultrasound, which is referred to by experts as the "paint brush method". If a "paint brush method" is mentioned within the context of the present application, this is to be understood as a reference to the publications of this patent family. Both WO 2009/150066 A1 and WO 2009/150067 A1 relate to the non-destructive testing of test objects with a great wall thickness. Amongst experts, the method disclosed therein is referred to as the "dynamic depth focusing method" (DDF method). If a "DDF method" is mentioned within the context of the present application, this is to be understood as a reference to the teaching of the above-mentioned two documents.

In addition, reference may be made to DE 10 2005 051 781 A1, which describes a method in which the transsonified test object volume is scanned, voxel by voxel, for echo signals by specific application of synthetic focusing by means of repeated application of an evaluation algorithm while varying the focusing parameters.

A reception processing rule can be, for example, an evaluation rule in accordance with the teaching of U.S. Pat. No. 7,429,352 B2, i.e. an evaluation in accordance with the so-called "paint brush method". Alternatively, it can be an evaluation in accordance with an embodiment of the "dynamic depth focusing method" as described in WO 2009/150066 A1 or WO 2009/150067 A1. Also, an evaluation rule analogous to the method described in DE 10 2005 051 781 A1 is also possible.

More particularly, the reception processing rules applied to the echo signal set differ in at least one of the reception processing parameters, such as, e.g., the number or/and the identity of the ultrasonic receiving transducers, the receiving transducer-specific phase shifts, or the variation of the receiving transducer-specific phase shifts, e.g. running time-delayed.

Finally, reference may be made to the subsequently published patent application of earlier priority with the official file number DE 10 2014 107 819 by the owner of the present application, from which a method and a device for the non-destructive testing of a test object by means of ultrasound are known. The method disclosed therein and the device disclosed therein are based on the use of ultrasonic holography methods for the generation of an ultrasonic field insonified into the test object. Methods such as "paint brush" and "dynamic depth focusing" are used on the receiving side. By this reference, the contents of the disclosure of this subsequently published patent application are also added in their entirety to the disclosure of the present application.

In an embodiment of the method according to embodiments of the invention, an image of at least one section of the volume of the train wheel is generated in a further method step, based on the result of the applied plurality of reception processing rules. Such an image can be a 2- or 3-dimensional representation of the volume of the train wheel to be tested, or a B, C or sector scan. The generated representation is then displayed on a suitable display unit, such as an LCD.

Since a train wheel is a (substantially) rotationally symmetric test object, geometry-related echoes can by eliminated in a simple manner by an average value over the obtained voxel echo amplitudes being formed for one voxel with a predetermined position in the radial and axial direction for all rotation angles of the train wheel. This average value is then subtracted from the echo amplitude of the individual voxels. Due to the rotational symmetry of the train wheel, geometry-related echoes are not dependent on the rotation angle of the wheel and are eliminated in this way. In an embodiment, this is advantageous particularly for a 2- or 3-dimensional representation of the train wheel to be tested, in particular for a representation of the entire volume of the train wheel, the examined region of interest of the train wheel or even a projection of flaw indications onto the surface of the train wheel, which is represented three-dimensionally, for example. A corresponding method is apparent from the German patent application DE 2013 106 901, filed on Jul. 1, 2013. By this reference, the contents of the disclosure of this subsequently published patent application are also added in their entirety to the disclosure of the present application.

In an embodiment, there is another advantageous development which can be used alternatively and/or in addition to the development mentioned last. The method disclosed therein and the device disclosed therein are not based on an averaging of the above-mentioned voxel echo amplitudes over all rotation angles of the train wheel, but on forming the derivative of the voxel echo amplitude with respect to the rotation angle and its evaluation as a function of the rotation angle. In particular, embodiments of this method has advantages with regard to an increase in contrast. By this reference, the contents of the disclosure of this patent application are also added in their entirety to the disclosure of the present application.

In a development of the method according to embodiments of the invention, a sound field geometry of the ultrasonic field insonified into the train wheel, which is adapted to the geometry of the train wheel to be tested and to the testing task to be carried out, is determined in a method step that generally takes place earlier. Then, the ultrasonic transmitting transducer-specific digital transient excitation functions are calculated that are suitable for generating an ultrasonic field in the train wheel with the predefined sound field geometry by means of the array of ultrasonic transmitting transducers. It was found that the suitable ultrasonic transmitting transducer-specific digital transient excitation functions can be determined based on a point transfer algorithm or a Fourier Transform algorithm, both of which are known from the prior art.

In principle, it is technically possible to generate, by means of digital-to-analog conversion, ultrasonic transmitting transducer-specific analog transient excitation signals from the stored ultrasonic transmitting transducer-specific digital transient excitation functions. In practice, however, this may entail an increased technical expenditure due to the required high excitation voltages. In practice, it has proved to be simpler, instead of a digital-to-analog conversion of the stored ultrasonic transmitting transducer-specific digital transient excitation functions, to approximate the corresponding analog transient excitation functions in each case by means of a series of multilevel square wave signals. A variety of multilevel square wave signal generators that are capable of generating several discrete positive and negative voltage levels in the required frequency range, which is typically between 1 and 100 MHz, and in the range of some 10 to 100 volts, is available in the prior art. Details in this regard will be addressed in connection with the exemplary embodiments.

Generally, an increase of the signal-to-noise ratio can be achieved by a transducer-specific coding, e.g. an individual high-frequency modulation, being additionally modulated onto the transducer-specific transient transmission signals used on the transmitting side. This high-frequency modulation can be detected on the receiving side and be used for associating the detected echo signal with the respective ultrasonic transmitting transducer. It is also possible to provide the transmission signals of groups of ultrasonic transmitting transducers with a uniform coding.

In a particular way of carrying out the method does not work with a particular insonification angle that is being varied electronically from pulse to pulse. Rather, it is possible to generate by means of an array of transmitting transducers that can be linear, but is more particularly two-dimensional, a divergent ultrasonic field forming a line-like focus in the region of interest of the train wheel to be tested. Reception and evaluation is then carried out by means of the individual ultrasonic transducers of the array, as described in the reception-specific features a to c of claim 3. Also in this case, the application of the reception processing rules can be done, in accordance with the "paint brush method".

The features, modes of operation and advantages discussed above of the method according to embodiments of the invention and of its various advantageous embodiments can also be directly transferred to the testing device according to embodiments of the invention discussed below and its various advantageous configurations and embodiments.

A device according to embodiments of the invention for the non-destructive testing of a train wheel by means of ultrasound comprises an ultrasonic transmitting unit configured to generate, by means of an array of individually controllable ultrasonic transmitting transducers acoustically coupled to the train wheel, a pulsed ultrasonic field in the train wheel to be tested, by the ultrasonic transmitting transducers each being controlled with a specific analog transient excitation signal. Each analog transient excitation signal is generated by the ultrasonic transmitting unit based on an ultrasonic transmitting transducer-specific digital transient excitation function stored in the ultrasonic transmitting unit.

Moreover, the testing device comprises an ultrasonic receiving unit configured for receiving resulting echo signals from the train wheel by means of an array of individually controllable ultrasonic receiving transducers, with each ultrasonic receiving transducer providing an analog time-resolved echo signal.

In an embodiment, the analog echo signals that were received in a time-resolved manner are digitized in a transducer-specific way and temporarily stored in the form of an echo signal set in a temporary memory, by means of suitable functional groups in the ultrasonic receiving unit.

In an embodiment, the ultrasonic receiving unit is further configured to apply a plurality of different reception processing rules to the echo signal set. Such a reception processing rule is characterized by at least the following reception processing parameters: the number and identity of the ultrasonic receiving transducers whose echo signals are being taken into account in the reception processing rule, individual phase shifts applied to the echo signals taken into account in the reception processing rule, and, if applicable, time frames in which the echo signals lie that are to be taken into account in the reception processing rule.

In an embodiment of the testing device, the applied reception processing rules differ in at least one of the reception processing parameters.

In an embodiment of the testing device, the ultrasonic receiving unit is further configured to generate an image of at least one section of the volume of the train wheel based on the result of the applied plurality of reception processing rules. This can be, in particular, two- or three-dimensional. Furthermore, it can be B, C or sector scans of the train wheel to be tested.

In an embodiment, the testing device is adapted to the specific geometry of the train wheel to be tested. In this embodiment, the ultrasonic transmitting unit is configured for insonifying an ultrasonic field into the train wheel whose sound field geometry is adapted to the geometry of the region of interest of the train wheel to be tested and to the testing task to be carried out.

In a development thereof, the ultrasonic transmitting unit further comprises a calculating unit configured for determining the ultrasonic transmitting transducer-specific digital transient excitation functions that are suitable for generating an ultrasonic field in the train wheel with the predefined sound field geometry by means of the array of ultrasonic transmitting transducers. In particular, the calculating unit can be configured for determining the suitable ultrasonic transmitting transducer-specific digital transient excitation functions based on a point transfer algorithm or a Fourier Transform algorithm.

In an embodiment of the testing device, the ultrasonic transmitting unit is configured to generate the ultrasonic transmitting transducer-specific analog transient excitation functions by means of a series of multilevel square wave signals.

In an embodiment of the testing device, the reception processing rules implemented in a functional unit of the ultrasonic receiving unit represent an implementation of the paint brush method or of the dynamic depth focusing method.

Within the context of the exemplary embodiments, embodiments of the ultrasonic transmitting unit and of the ultrasonic receiving unit are discussed by way of example, from which, in particular, further information becomes apparent on how to above-mentioned functional units/functional groups can be realized technically.

Further and features of the method according to embodiments of the invention and the testing device according to embodiments of the invention are explained below with reference to exemplary embodiments. They are to be understood as examples and as non-limiting, wherein features of the exemplary embodiments may possibly be combined with the features of the claimed methods or testing devices.

The exemplary embodiments will be explained with reference to the attached drawing, in which:

DETAILED DESCRIPTION OF THE INVENTION

Figure 1:
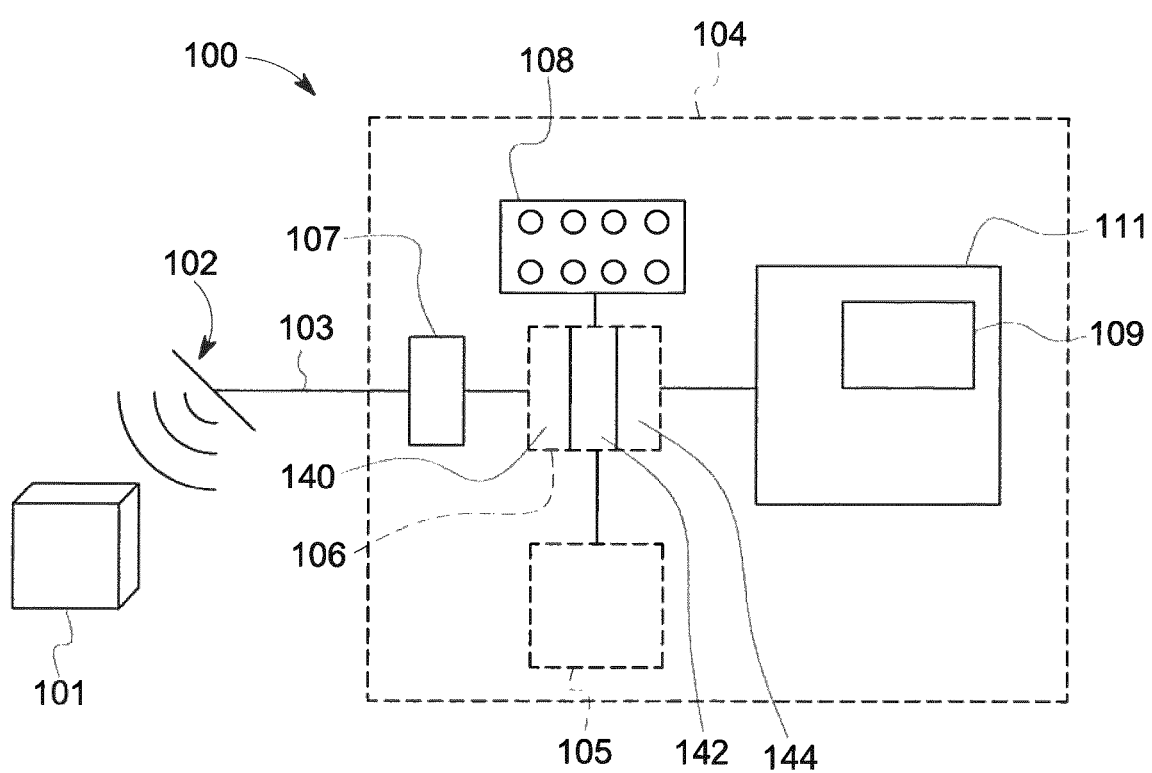
FIG. 1 is a schematic illustration of an exemplary ultrasonic holography system and an environment in which the system is used.

It is noted that the drawings are not necessarily to scale. The drawings are only supposed to represent typical forms of appearance of the subject matter disclosed herein, and should therefore not be understood as a limitation for the scope of the disclosure.

In the drawings, identical numbers represent identical elements in the drawings.

Certain exemplary embodiments will now be described in order to provide an overall understanding of the principles of the structure, the function, the manufacture and the use of the devices, systems and methods disclosed herein. One or more examples of these embodiments are shown in the accompanying drawings. Persons skilled in this art will understand that devices, systems and methods that are specifically described herein and illustrated in the accompanying drawings are non-limiting exemplary embodiments and that the scope of the present invention is defined solely by the claims. The features that are illustrated or described in connection with an exemplary embodiment can be combined with the features of other embodiments. Such modifications and variations are to be included in the scope of the present invention.

Ultrasonic holography imaging systems using analog excitation signals can generate detailed sound fields that are not limited by the configuration of the ultrasonic transducer array, in order thus to provided for improved imaging that can start with the shape and configuration of the physical object that is currently being displayed. The excitation signals can have a varying amplitude, frequency, phase, time shift or modulation of parameters over the ultrasonic transducer elements in order to achieve these effects.

However, the generation of such analog excitation signals requires complex and expensive circuits and consumes much energy. Moreover, systems using such signals are not readily accessible for the implementation using ASICs, are limited with regard to the voltage levels that can be used for the excitation pulse, and are limited with regard to speed.

Accordingly, systems and methods are disclosed herein in which multilevel square wave excitation signals are used instead of, or in addition to, fully analog excitation signals in order to control a panel of ultrasonic transducers elements to generate a sound field. The use of multilevel square wave excitation signals generates an acceptable ultrasonic transducer output with a reduced complexity, costs and/or energy consumption as compared to the use of fully analog excitation signals. Furthermore, the use of such signals facilitates the system implementation using application-specific integrated circuits (ASICs), and is not limited with regard to voltage level and speed. At the same time, the advantages and applications of fully analog excitation signals (e.g. acoustic holography, beam superposition, improvements in the signal-to-noise ratio (SNR), suppression of parasitic modes, increased material penetration, potential for coded pulse algorithms and suppression of side lobes in the ultrasonic field) can nevertheless be achieved with multilevel square wave excitation signals.

As used herein, the terms multilevel square wave and multilevel square oscillation are used in an exchangeable manner in order to relate to signals that have several square or rectangular pulses or steps with discontinuous amplitude levels (positive and/or negative).

FIG. 1 is a schematic illustration of an exemplary ultrasonic holography imaging system 100 for use in carrying out the method according to embodiments of the invention on a physical object 101, which in this case is a train wheel. The system 100 comprises an ultrasonic transducer array 102 coupled to a processing system 104 via a connection 103.

The ultrasonic transducer array 102 emits ultrasonic pulses and also receives ultrasonic waves reflected on the physical object 101. More specifically, ultrasonic waves emitted by the ultrasonic transducer array 102 penetrate the physical object 101 and are reflected on structures within the physical object 101, such as, for example, regions of a reduced density (which may indicate corrosion) or other fractures or variations within the physical object 101. The ultrasonic transducer array 102 is a rectangular panel (m times n units) of ultrasonic transducer elements 110 (illustrated in FIG. 2). Even though a rectangular panel is shown in the illustrated embodiment, it is possible that other types of panel can be used, including a multi-element ultrasonic transducer array with a fixed geometric positioning of the individual ultrasonic transducer elements. Exemplary types of panel comprise, without limitation, those having angle segments of concentric rings and/or dispersed panels in which not all possible positions are occupied by ultrasonic transducer elements. Each ultrasonic transducer element is a piezo-electric ultrasonic transducer element. However, it is possible that other types of ultrasonic transducer elements are used, instead of or in addition to such electromagnetic acoustic ultrasonic transducers ("EMATs") or capacitive micromachined ultrasonic transducers ("CMUTs"). Each ultrasonic transducer element 110 is designed for transmitting and receiving ultrasonic wave forms. It is possible that separate transmitter or receiver elements can be used instead of or in addition to the usual ultrasonic transducer elements.

The connection 103 can be any suitable connection device that is sufficient to enable the functioning of the system 100 as described herein, inclusive of a hard-wired assembly, for example.

The processing system 104 comprises an analog processing portion 107 connected to a digital processing portion 106. The digital processing portion 106 is connected to a storage or another storage device 105 and a user input device 108 (e.g. an operating panel, a keyboard, a keypad or another device or devices). The digital processing portion 106 provides signals for a display 111 in order to generate a display image 109.

During operation, several series of recordings of the physical object 101 are prepared while the physical object 101 is being imaged. Accordingly, the ultrasonic transducer array 102 is moved into a first position relative to the physical object 101, and one or more series of ultrasonic pulses are emitted to the physical object 101. Reflections of these ultrasonic pulses are recorded by the ultrasonic transducer array 102, and data corresponding to the emitted pulses and corresponding received reflections are stored and processed. The ultrasonic transducer array 102 is then moved into another position relative to the physical object 101, and another series of recordings is made. The number of the recordings made and of the positions used depends on the configuration of the physical object 101 and on the type of data that are being detected (e.g. imaging for detecting flaws, etc.).

The ultrasonic transducer array 102 can be induced by the digital processing portion 106 to emit ultrasonic waveforms that in turn, upon contact with the physical object 101, cause a variety of different waveforms to propagate through the physical object 101. Exemplary waveforms include compression waves or shear waves that enter the interior of the physical object and are used for inspection with respect to cracks of for detecting internal flaws, Rayleigh waves, which are usually limited to the surface of the physical object and are used, for example, in the analysis or the determination of mechanical or structural properties of a material, such as crack formation, for example; Lamb waves, which normally propagate along the wall of a physical object and are used, for example, for finding and characterizing internal flaws and cracks in the physical object, and creeping waves, which normally serve for gaining access to regions hidden under other parts of the physical objects, such as weld seams or solder points, for example.

Figure 2:
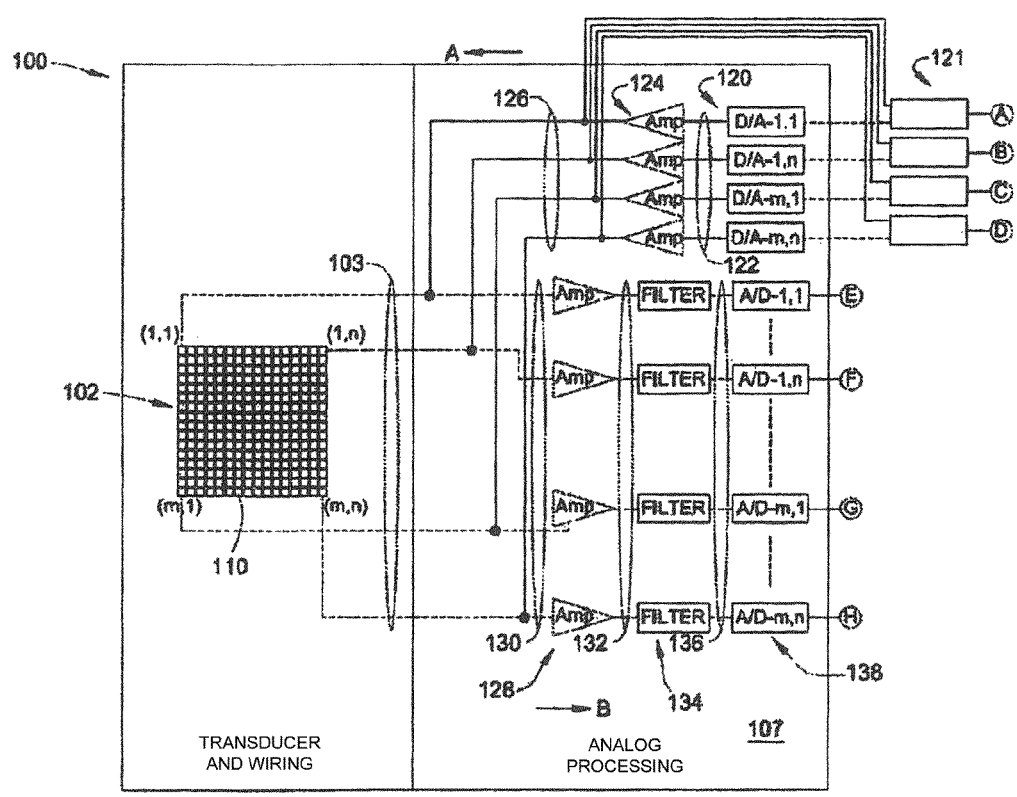
FIG. 2 is a part of a circuit diagram illustrating the system of FIG. 1.
Figure 3:
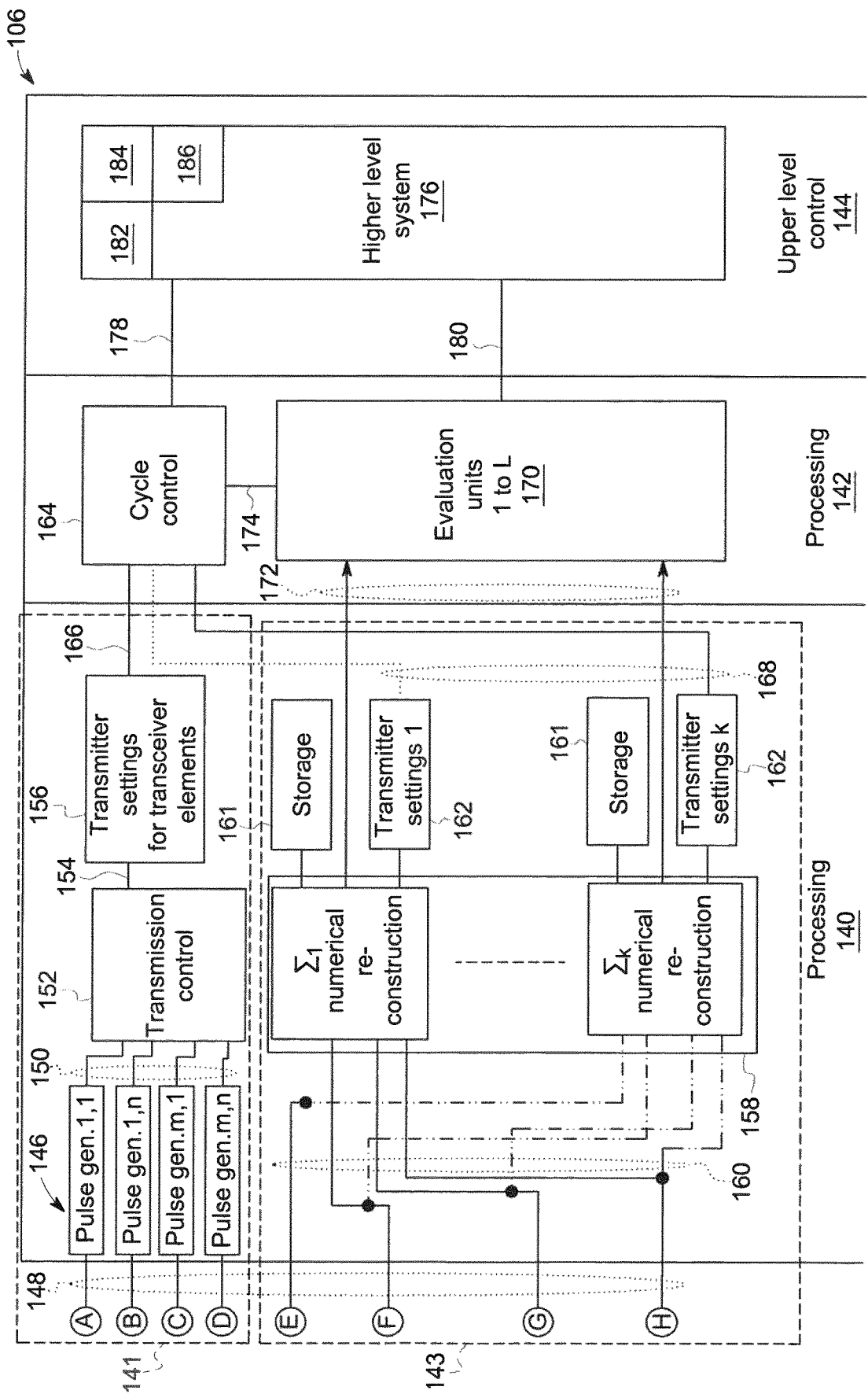
FIG. 3 is another part of a circuit diagram illustrating the system of FIG. 1.

Together, FIGS. 2 and 3 form a circuit diagram illustrating the system 100. Specifically, FIG. 2 shows the ultrasonic transducer array 102 and the analog processing portion 107, and FIG. 3 shows the digital processing portion 106.

Figure 17:
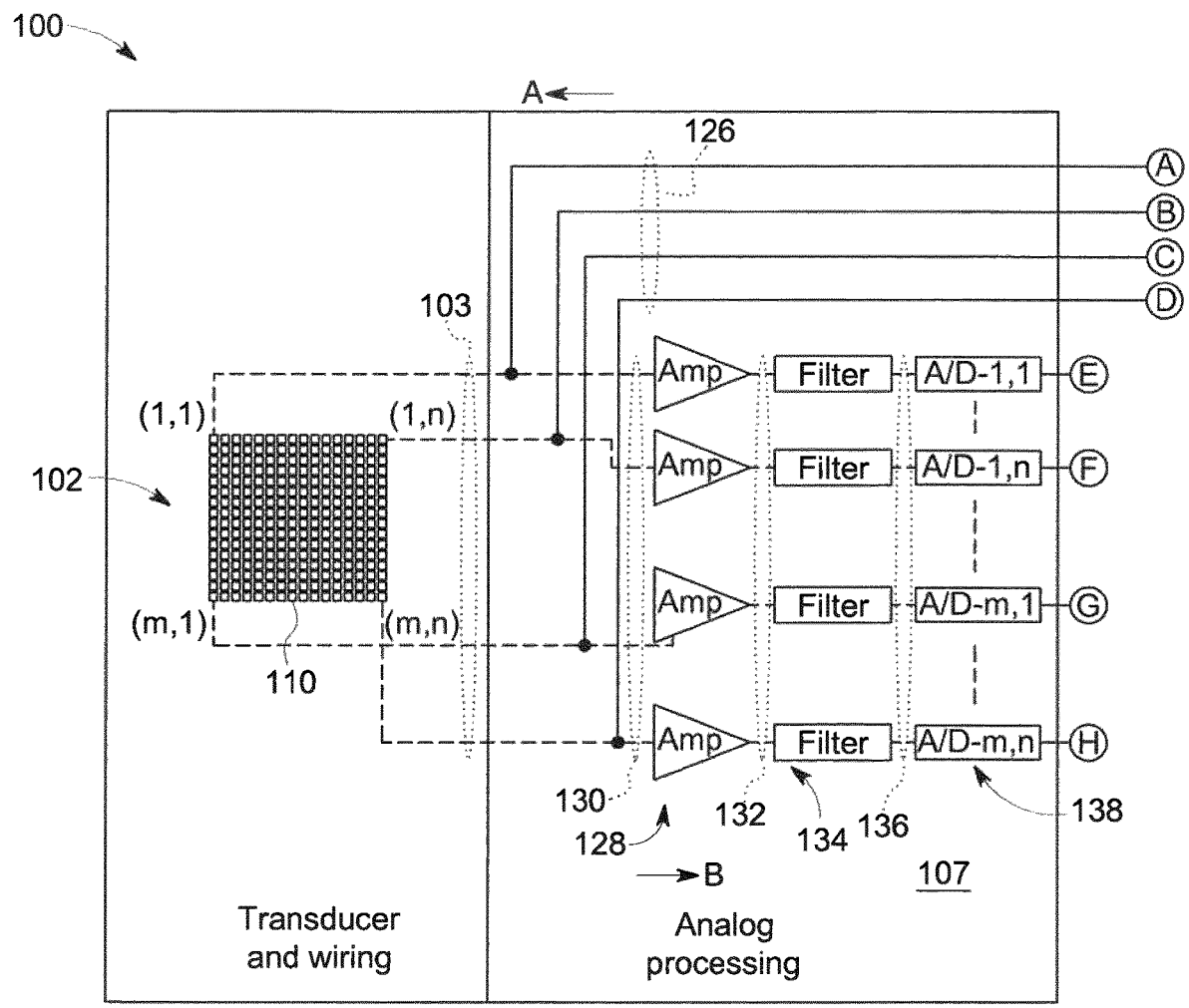
FIG. 17 is a part of a circuit diagram illustrating another exemplary embodiment of an ultrasonic holography system.
Figure 18:
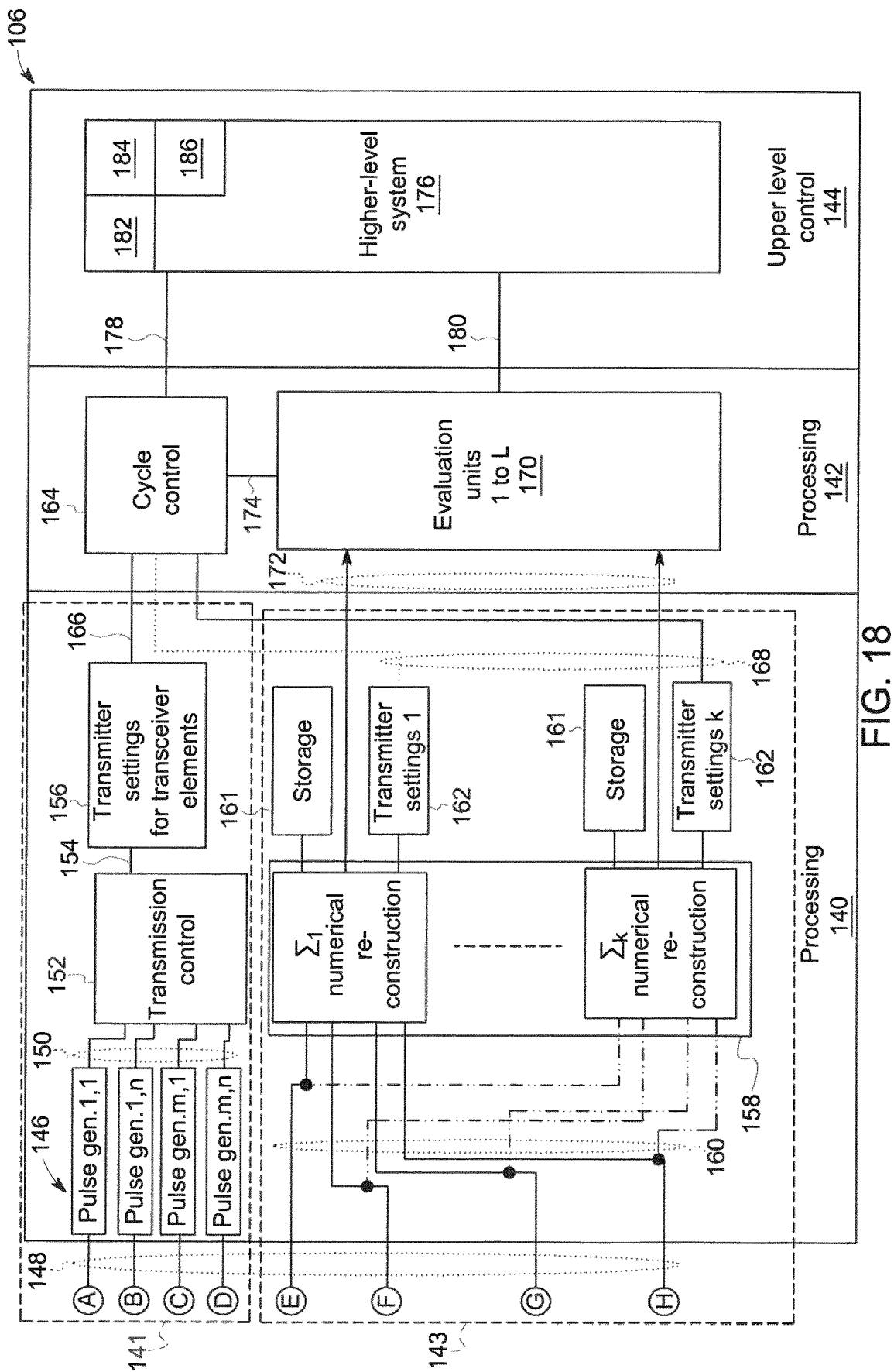
FIG. 18 is another part of the circuit diagram of FIG. 17.

The analog processing portion 107 carries out the pre-processing of signals transmitted between the ultrasonic transducer array 102 and the digital processing portion 106. The analog processing portion 107 makes it possible to switch between operating modes of the system 100. As described in detail below, the system 100 can be operated in a first mode in which multilevel square-wave excitation pulses are used, and in a second mode in which fully analog excitation pulses are used. It is possible, however, that the system does not necessarily have to contain arrangements for working in the second mode, in which case circuits required for generating fully analog excitations pulses can be omitted, as discussed below and shown in FIG. 17-18. Further, it is possible that the system is capable of working in any number of hybrid operating modes in which one or more ultrasonic transducer elements 110 are controlled by multilevel square-wave excitation pulses and one or more ultrasonic transducer elements are controlled by fully analog excitation pulses.

In the first operating mode, the analog processing portion 107 forwards excitation signals generated by the digital processing portion 106 to the ultrasonic transducer array 102 (as indicated by the arrow A, which points to the left), in order to excite selected ultrasonic transducer elements 110. In the second operating mode, the analog processing portion 107 converts digital signals generated by the digital processing portion 106 into analog signals and amplifies the analog signals before it forwards them to the ultrasonic transducer array 102.

In every operating mode, the analog processing portion 107 also converts analog signals, which are transmitted by the ultrasonic transducer elements 110 and which represent ultrasonic waves reflected by the physical object 101 and received by the ultrasonic transducer elements 110, into digital signals and transmits these digital signals to the digital processing portion 106 (as indicated by an arrow B pointing to the right).

The analog processing portion 107 includes several switching devices 121 designed for the selective connection of the outputs of corresponding several pulse generators 146 (shown in FIG. 3) at different locations in the analog processing circuits, depending on the selected operating mode of the system 100. In particular, the switching devices 121, in the first operating mode, are designed in such a way that the outputs of the pulse generators 146 are directly connected to the ultrasonic transducer elements 110 (via several connections 126 and several connections 103). In the second operating mode, the switching devices 121 are designed in such a way that the outputs of the pulse generators 146 are connected to several digital-to-analog converters ("D/A") 120, which in turn are connected to corresponding several amplifiers 124 via several connections 122. The amplifiers 124 are connected via several connections 126 and the several connections 103 to corresponding ultrasonic transducer elements 110.

Even though only four sets of switching devices 121, D/A converters 120, amplifiers 124 and connections 103 are shown, it is clear that one set of these components is provided for each of the ultrasonic transducer elements 110 and connected thereto.

The analog processing portion 107 also comprises several amplifiers 128 that are connected via connections 130 to the connections 103 and in turn to corresponding ultrasonic transducer elements 110. Even though only four amplifiers 128 are illustrated, it is clear that there is one amplifier 128 connected to each of the ultrasonic transducer elements 110. Each of the amplifiers 128 is connected via several connections 132 to one of the corresponding several filters 134. Each of the filters 134 is connected via several connections 136 to one of the corresponding several analog-to-digital converters ("A/D") 138. The filters 134 can be any suitable electronic signal filters that are necessary to let the system 100 function in the way described herein. The A/D converters 138 convert electronic waveforms received by the ultrasonic transducer elements 110 and transmitted to the A/D converters 138 into digital signals.

The analog processing portion 107 is connected to the digital processing portion 106. As shown in FIG. 3, the digital processing portion 106 comprises a primary digital processing portion 140, a secondary digital processing portion 142 and an upper level control portion 144. The primary digital processing portion 140 comprises a waveforming portion 141 and an image reconstruction and evaluation portion 143.

In the waveforming portion 141, several pulse generators 146 are connected via several connections 148 to corresponding switching devices 121 (shown in FIG. 2). Also, the pulse generators 146 are connected via several connections 150 to a transmitter control unit 152. The transmitter control unit 152 controls the pulse generators 146, depending on the operating mode of the system 100, to generate multilevel square-wave excitation pulses, fully analog excitation pulses and/or a combination thereof. The transmitter control unit 152 optionally controls the pulse generators 146 in such a way that they generate the excitation pulses according to varying factors, such as, for example, amplitude, frequency, phase, time shift, amplitude modulation, phase modulation and frequency modulation, in relation to each ultrasonic transducer element 110. In embodiments in which the capability for generating fully analog excitation pulses is omitted (e.g. the embodiment shown in FIGS. 17-18), the pulse generators 146 can be simple pulse sequence generators especially configured for generating multilevel square-wave excitation pulses.

The transmitter control unit 152 is connected via a connection 154 to a transmitter setting unit 156. The transmitter setting unit 156 stores and monitors settings for the ultrasonic transducer elements 110 required for generating a specially shaped ultrasonic pulse field, including the selection of the excitation pulse type as well as the excitation pulse timing, strength, amplitude, frequency, time shift and modulations of the same for each pulse emitted by each ultrasonic transducer element 110. The ultrasonic pulses propagate into the material region, where they overlap one another. The result of this interference process is an acoustic image generated in the material.

In the image reconstruction and evaluation portion 143, a summing unit 158 is connected to each of the A/D converted 138 (shown in FIG. 2) via several connections 160. Each A/D converter 138 generates a digitized single-element signal (also referred to as "A-scan"). In order to carry out a numerical reconstruction of the reflected sound field embodied in the individual A-scans, the summing unit 158 carries out a summing process (which is also referred to as a "numerical reconstruction") on the data signals that were received by each of the piezo-electric units in order to generate a virtual A-scan of the entire physical object 101. In the illustrated embodiment, the summing unit 158 is configured as units in several FPGAs, even though it can be seen that other components can be used instead of or in addition to the FPGAs, such as ASICs, for example.

The summing unit 158 is configured to apply a plurality of different reception processing rules to this temporarily stored echo signal set, which is correlated with a single ultrasonic pulse insonified into the object 101 to be tested, in this case a train wheel, and which consists of a plurality of transducer-specific A-scans. In this case, a reception processing rule is characterized by at least the following reception processing parameters: the number and identity of the ultrasonic receiving transducers whose echo signals are being taken into account in the reception processing rule, individual phase shifts applied to the echo signals taken into account in the reception processing rule, and, if applicable, time frames in which the echo signals lie that are to be taken into account in the reception processing rule.

A reception processing rule can be, for example, an evaluation rule in accordance with the teaching of U.S. Pat. No. 7,429,352 B2, i.e. an evaluation in accordance with the so-called "paint brush method". Alternatively, it can be an evaluation in accordance with an embodiment of the "dynamic depth focusing method" as described in WO 2009/150066 A1 or WO 2009/150067 A1. Also, an evaluation rule analogous to the method described in DE 10 2005 051 781 A1 is also possible.

More particularly, the reception processing rules applied to the echo signal set differ in at least one of the reception processing parameters, such as, e.g., the number or/and the identity of the ultrasonic receiving transducers, the receiving transducer-specific phase shifts, or the running time-related variation of the receiving transducer-specific phase shifts.

The image reconstruction and evaluation portion 143 further comprises several storage elements 161 for storing incoming unprocessed raw digital signals transmitted by the A/D converters 138. Storing such signals makes it possible to carry out multiple evaluations using a simple set of incoming data, e.g. for the purpose of improving the quality of subsequently processed digital signals.

The image reconstruction and evaluation portion 143 has several functions. On function is to translate raw analog data signals, which were transmitted by the ultrasonic transducer array 102 and previously processed by the analog processing portion 107 while applying the above-mentioned reception processing rules, into a series of A-scan sums. The A-scan sums serve as a basis for the ultrasonic test evaluation, which is carried out in the secondary digital processing portion 142, specifically in evaluation units 1-L, whose results can be used in cooperation with automation systems or image maps, such as B-scans or C-scans, as they are known to persons skilled in this art. Together, the series of A-scan sums form an unprocessed virtual image of the physical object 101. The image reconstruction and evaluation portion 143 processes the raw virtual image for removing noise by optimizing echoes generated by features inside the physical object 101, which serve as reflectors of the ultrasonic waves emitted into the physical object 101. Such reflectors can constitute flaws within the physical object 101. The functions assigned to the secondary digital processing portion 142 can be performed by all suitable processor devices designed in such a way that they enable the functioning of the secondary digital processing portion 142 as described herein.

As in the analog processing portion 107 and the primary digital processing portion 140, the secondary digital processing portion 142 comprises functions relating to the generation of the waveforms that the ultrasonic transducer array 102 transmits into the physical object 101, as well as functions relating to the processing of waveforms that are reflected by the physical object 101 and received by the ultrasonic transducer array 102. A cycle control unit 164 is connected via a connection 166 to the transmitter setting unit 156 and via several connections 168 to the summing unit 158. The evaluation units 170 are connected via the connections 172 to the summing unit 158 and via a connection 174 to the cycle control unit 164.

The cycle control unit 164 is connected to a higher-level processing unit 176, which is located in the upper level control portion 144, via a connection 178. The evaluation units 170 are connected via (a) connection(s) 180 to the higher-level processing unit 176.

The cycle control unit 164 is designed for regulating the operations of the system 100. Specifically, the system 100 works in a series of cycles. Each cycle comprises a set of specifically designed ultrasonic pulses (or "bursts") emitted by each of the ultrasonic transducer elements 110, followed by a pause, followed by the reception of a series of reflected sound waves by each of the ultrasonic transducer elements 110, which in turn are converted by the analog processing portion 107 into a series of digital signals, which are to be processed by the digital processing portion 106. Data corresponding to each set of ultrasonic pulses are stored in the cycle control unit 164 in the form of a table (a "cycle table") which defines various features of each series of pulses, such as, for example, the number of recordings to be made, the directions in which each recording is made, the number of positions around the physical object 101 of which recording are to be made, etc.

The evaluation units 170 perform ultrasonic test evaluations on raw virtual images generated and stored in the summing unit 158, or on results derived therefrom, using methods known the persons skilled in this art. Each raw virtual image represents several ultrasonic reflections of "ultrasonic recordings" recorded in a predefined series of time intervals and several position around the physical object 101 in order to generate a three-dimensional ultrasonic field.

Another function of the evaluation units 170 is the correlation of data detected during testing with positions on the physical object 101. Specifically, position encoders (not shown) are connected to the ultrasonic transducer array 102 and to the digital processing portion 106 in order to report and record positions of the ultrasonic transducer array 102 relative to the physical object 101. The analysis of the ultrasonic field comprises the selection of a segment or of a "slice" of the time (also referred to as "time-span"), for example. The time-span is analyzed in order to determine the greatest sound wave amplitude within the time-span and a measured running time associated with this amplitude.

As used herein, "running time" of an echo relates to the amount of time that a sound wave requires in order to run through the physical object 101 and back from an echo-producing feature of the physical object. The selected amplitude is compared to a predetermined reference amplitude, and the measured running time is compared to a predetermined reference running time. If the selected amplitude exceeds the value of the reference amplitude, then it is assumed that a defect is present at a physical location within the physical object 101, which is associated with the selected time-span. Analogously, defects can be found by evaluating the running time. For example, a measured running time associated with a selected time-span which is registered below a predetermined running time can be an indication that the thickness of the material in the physical object 101 at the associated location is too small (e.g. due to internal corrosion at that location). Alternatively, the measured running time can be greater than the predetermined reference running time for situations in which corrosion in present on an external surface of the physical object 101.

The higher-level processing unit 176 includes PCs, desktop systems, individual CPUs and/or other systems using the evaluations that are generated by the evaluation units 170 in order to perform various tasks, for example recording data relating to the physical object 101, stimulating a process control and/or generating a visualization for a user. Furthermore, the higher-level processing unit functions as a command center for the system 100, with a user inputting instructions and data, such as, for example, data relating to the physical object 101, and parameters which cause the waveforming portion 141 to generate signals that induce in the physical object 101 the desired acoustic image, which is adapted in such a way that it causes potential reflectors in the material to optimally reflect acoustic waves for the recording by the system 100 and the subsequent processing of these acoustic waves. In some embodiments, special types of acoustic waves, such as Rayleigh waves or Lamb waves, for example, are excited within the physical object 101.

The higher-level processing unit 176 also comprises display devices 182 (e.g. two- and three-dimensional visual displays), user input devices 184 (e.g. keyboards, touch screens, etc.), communication interfaces 186 and other equipment associated with ultrasonic material analysis, which is known to persons skilled in this art. Via the input devices 184, a user provides for inputs into the cycle control unit 164. The functions of the upper level control portion 144 are performed on a computer having a suitable configuration which enables the system 100 to function as described herein. The higher-level processing unit 176 receives processed digital data from the secondary digital processing portion 142 and transfers the data into visual displays that can be configured by a user by means of a suitable user interface, which is programmed into the higher-level processing unit 176, including functions such as, for example, the providing of correct "false colors" for two-dimensional displays and the generation of diagrams etc. Furthermore, the higher-level processing unit 176 preforms additional evaluation functions that are activated after a complete test of the train wheel 101 has been performed, such as, for example, the generation of analysis reports.

The various modules, units, components etc. of the system 100 can be implemented in hardware, software, firmware and a combination thereof. For example, parts of the system can be implemented using a processor. As used herein, the term "processor" can include a microcontroller, a microcomputer, a programmable logic controller (PLC) a field programmable gate array (uncommitted logic array) (FGPA), an application-specific integrated circuit (ASIC), integrated circuits, which are generally referred to in the art as computers, and other programmable circuits, and these terms are used in an exchangeable manner here. The processor can be connected to a storage, which includes a random access memory (RAM), a read only memory (ROM), a flash memory, a compact disk read only memory (CD-ROM), a magneto-optical disk drive (MOD), a DVD, a non-volatile computer-readable storage medium etc. The storage can store instructions for execution by the processor in order to implement the systems disclosed herein, or to perform the methods disclosed herein.

As remarked above, signals generated by the processing system 104 cause the ultrasonic transducer array 102 to emit ultrasonic bursts that are inhomogeneous over the depth and width of the ultrasonic transducer array 102.

Figure 4:
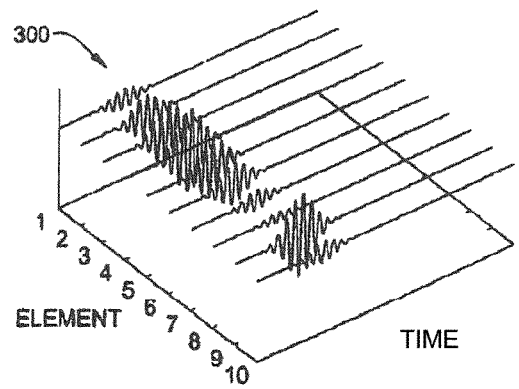
FIG. 4 is a perspective graphic representation of an exemplary series of waveforms used in an exemplary ultrasonic holography imaging system.
Figure 5:
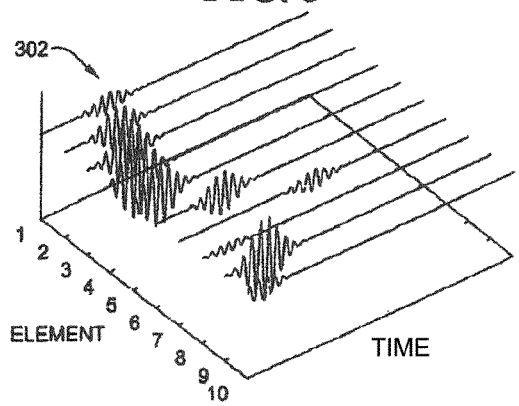
FIG. 5 is a perspective graphic representation of another series of waveforms used in an exemplary ultrasonic holography imaging system.
Figure 6:
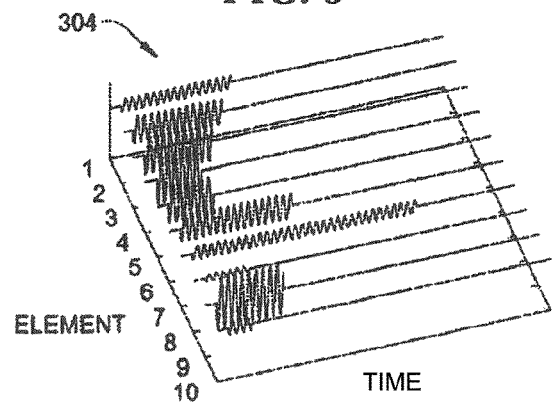
FIG. 6 is a perspective graphic representation of yet another series of waveforms used in an exemplary ultrasonic holography imaging system.

FIGS. 4-6 illustrate different configurations of waveforms and wavefronts provided by the system 100. FIG. 4 is a perspective graphic view of a series of waveforms 300 illustrating a first variation mode of bursts. For a simpler representation, bursts from a single row of the ultrasonic transducer elements 110 are shown. Specifically, the waveforms 300 represent bursts that vary in their amplitude but are constant in their duration and emission time. FIG. 5 illustrates a second variation mode of bursts in which several waveforms 302 represent bursts that vary with regard to amplitude and emission in time ("time shift") but have a constant duration. FIG. 6 illustrates a series of waveforms 304 representing a series of bursts which are shifted in time and variable with regard to amplitude and duration.

Figure 7:
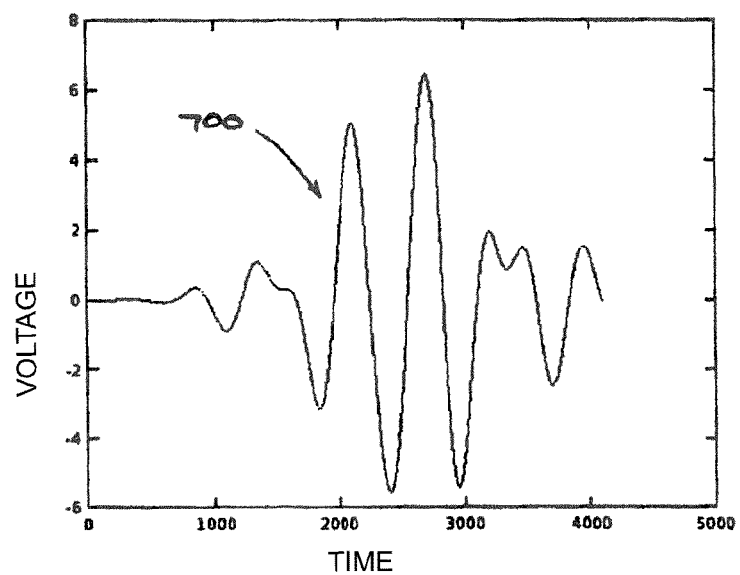
FIG. 7 is a graphic representation of the voltage as a function of time for an exemplary fully analog excitation pulse used in an exemplary ultrasonic holography imaging system.

In order to generate bursts shown in FIGS. 4-6, excitation signals are applied to the ultrasonic transducer elements 110. FIG. 7 illustrates an exemplary excitation signal in the form of an arbitrary fully analog excitation pulse 700. It is possible that, in practice, the circuits and components used for exactly and consistently generating the excitation pulse shown in FIG. 7 require a considerable level of complexity, production costs, energy consumption etc. Moreover, modules for generating such pulses are not readily accessible for implementation using ASICs and are limited with regard to voltage and speed.

Accordingly the system 100 may in some embodiments or in some operating modes be designed in such a way that it provides multilevel square-wave excitation pulses to the ultrasonic transducer elements 110 instead of fully analog excitation pulses of the type shown in FIG. 7.

Figure 8:
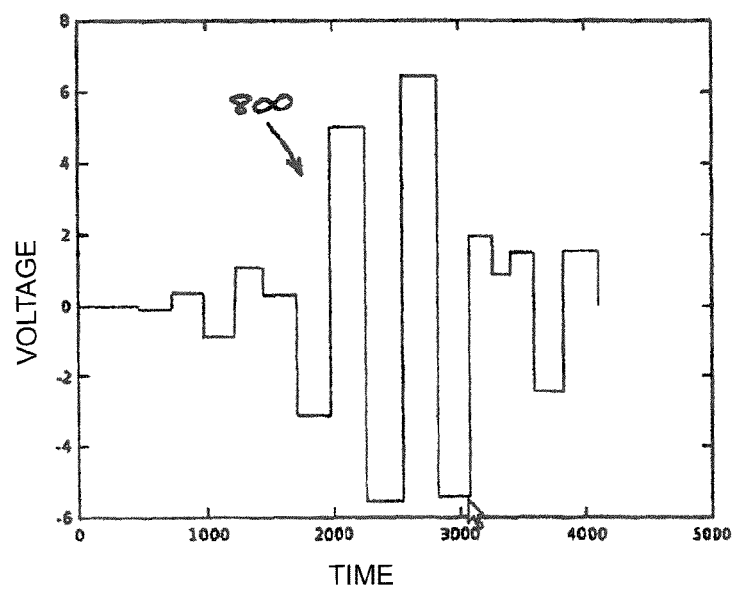
FIG. 8 is a graphic representation of the voltage as a function of time for an exemplary multilevel square-wave excitation pulse used in an exemplary ultrasonic holography imaging system.

FIG. 8 illustrates an exemplary multilevel square-wave excitation pulse 800. The illustrated pulse includes several square pulses or steps with separate positive and negative amplitude values. In some embodiments, the multilevel square-wave excitation pulse has several positive rectangular steps and several negative rectangular steps.

Figure 9:
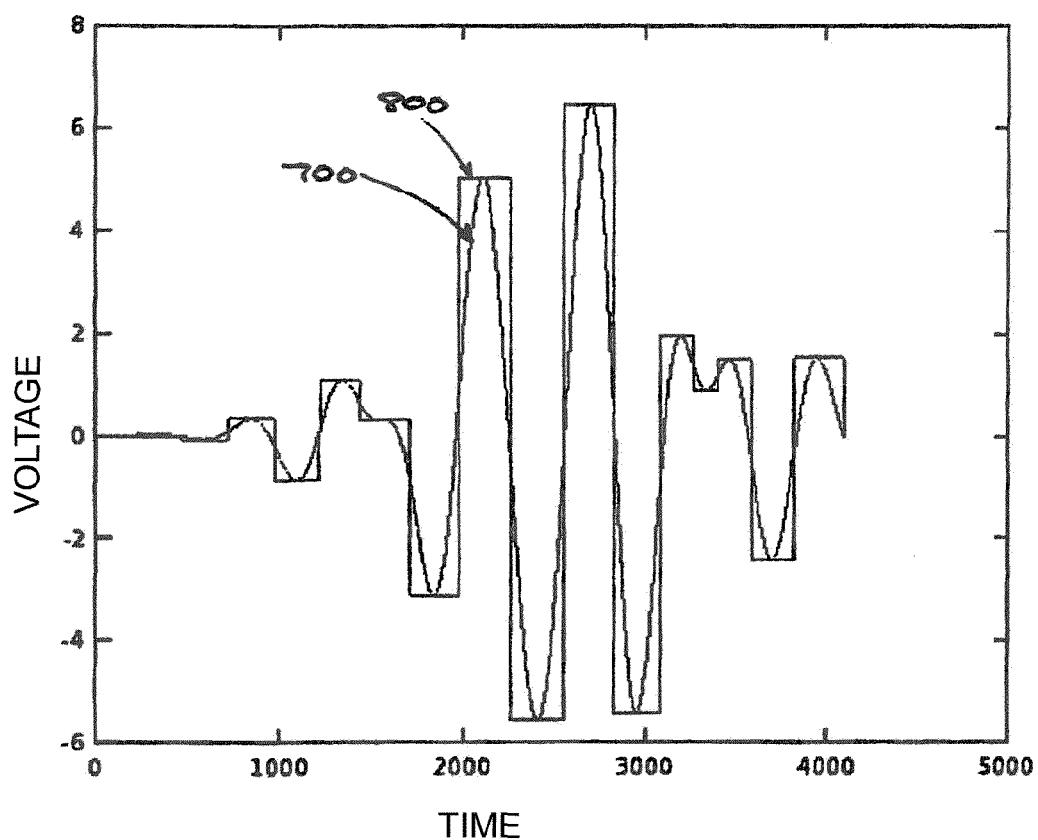
FIG. 9 is a graphic representation of the voltage as a function of time for the excitation pulse of FIG. 7 and the excitation pulse of FIG. 8.

The excitation pulses of FIGS. 7 and 8 are shown in a superposed manner in FIG. 9. As shown, the amplitudes of the positive and negative square pulses or steps of the multilevel square-wave excitation pulse 800 correspond to the positive and negative peaks of the analog excitation pulse 700. Furthermore, the widths of the positive and negative square pulses or steps of the multilevel square-wave excitation pulse 800 correspond to the widths between the points of inflection of the analog excitation pulse 700. Furthermore, the pulses 700, 800 are in phase in such a way that the transitions from one step to the next in the multilevel square-wave excitation pulse 800 are aligned in time with the points of inflection of the analog excitation pulse 700. It is therefore possible for the configuration of the multilevel square-wave excitation pulses 800 to be selected by rectangular-step scanning of a corresponding fully analog waveform 700.

The reaction of the ultrasonic transducer elements to an excitation signal is inherently analog and is unable to react immediately to the step change in the voltage of the multilevel square-wave excitation pulses 800. In other words: even though a multilevel square wave is used as an excitation pulse, the ultrasonic transducers do not emit the same multilevel square wave. Rather, the actual emitted ultrasonic waveform is the convolution of the multilevel square-wave excitation pulse and of the delta reaction function of the ultrasonic transducer. If it is assumed that the reaction of the ultrasonic transducer is a Gaussian function, the emitted ultrasonic waveform is very similar to the desired ultrasonic waveform, even if a multilevel square-wave excitation pulse is used instead of a fully analog waveform.

Accordingly, the output of an ultrasonic transducer element to which the multilevel square-wave excitation pulse 800 is applied can be identical or substantially identical with the output that would occur if the counterpart fully analog pulse were applied. Furthermore, the multilevel square-wave excitation pulses can be selected by the deconvolution processing based on the desired ultrasonic waveform and the delta reaction function of the ultrasonic transducer.

Therefore, the system 100 is designed to provide a comparable ultrasonic transducer output using multilevel square-wave excitation pulses, while the energy consumption, the system complexity and/or the costs are reduced in comparison with systems using fully analog excitation pulses.

Figure 10:
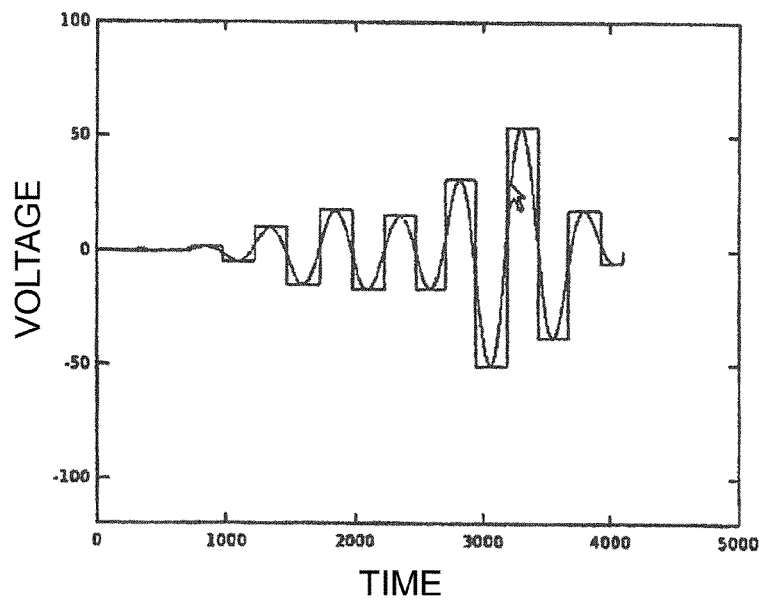
FIG. 10 is a graphic representation of the voltage as a function of time for an exemplary multilevel square-wave excitation pulse and a corresponding fully analog excitation pulse used in an exemplary ultrasonic holography imaging system.
Figure 11:
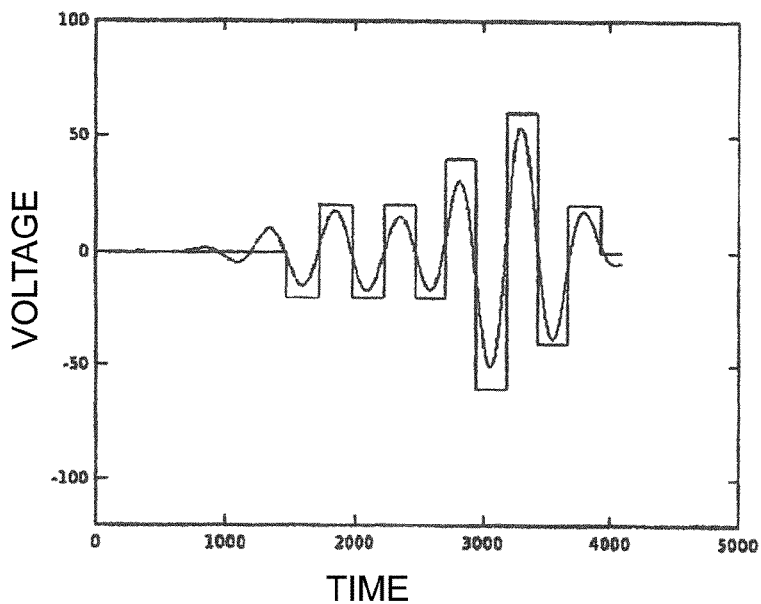
FIG. 11 is a graphic representation of the voltage as a function of time for an exemplary multilevel square-wave excitation pulse and a corresponding fully analog excitation pulse used in another exemplary ultrasonic holography imaging system.

The extent to which the multilevel square-wave excitation pulse corresponds to a counterpart fully analog excitation pulse is limited by the number of possible voltage levels or steps that can be incorporated into the multilevel square-wave excitation pulse. As shown in FIG. 10, the amplitude of the steps in the multilevel square-wave excitation pulse exactly or almost exactly corresponds to the amplitude of the peaks in the counterpart analog excitation pulse if the number of possible voltage levels is high. On the other hand, the peaks in the analog excitation pulse are mapped onto the closest voltage level, and the respective amplitudes may match exactly or not if the number of the possible voltage levels is reduced (as shown, for example, in FIG. 11). Generally speaking, the following applies: the greater the number of possible voltage levels available for building up the multilevel square-wave excitation pulses, the greater the extent to which the ultrasonic transducer output triggered by the pulse corresponds to the output if a corresponding fully analog excitation pulse is used. In some embodiments, the system 100 is designed to generate multilevel square-wave excitation pulses with up to five separate positive voltage levels, up to five separate negative voltage levels, and up to one zero-voltage level for a total of up to eleven steps (e.g. −100 V, −80 V, −60 V, −40 V, −20 V, 0 V, 20 V, 40 V, 60 V, 80 V, 100 V). In other embodiments, the system can be configured in such a way that it generates multilevel square-wave excitation pulses with more or fewer than eleven steps, only with positive steps, only with negative steps, with an unequal number of positive and negative steps, and/or with or without a zero-voltage step.

Figures 12, 13:
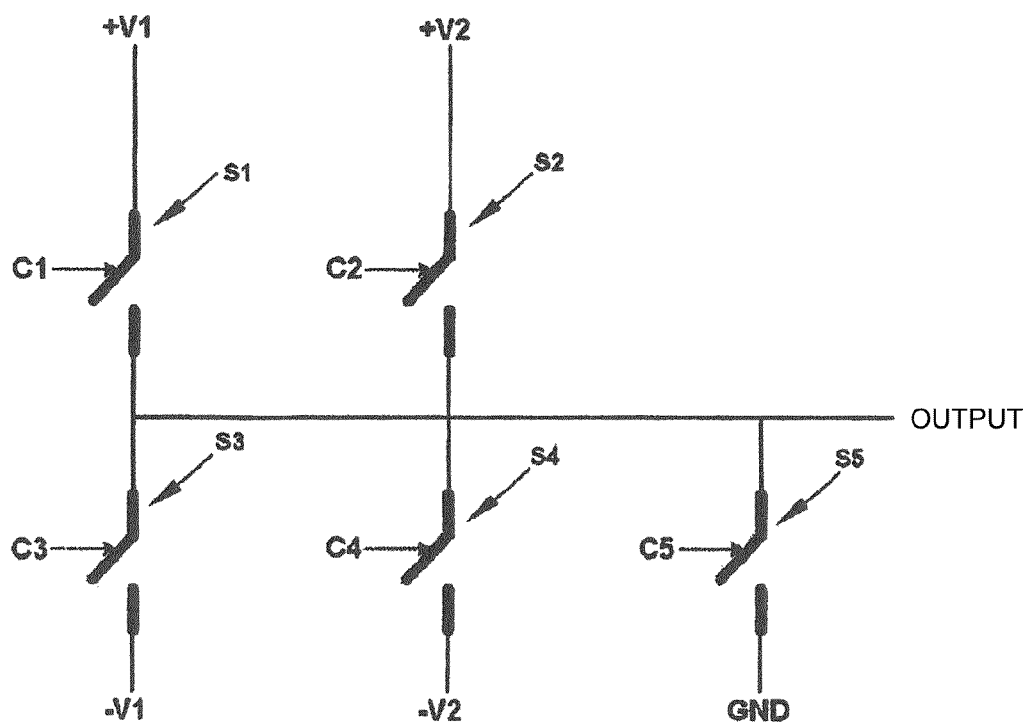
FIG. 12 is a circuit diagram illustrating a pulse generator portion of an exemplary ultrasonic holography system.
FIG. 13 is a partial truth table for the circuit of FIG. 12.

FIG. 12 is a schematic diagram of an exemplary circuit for generating multilevel square-wave excitation pulses of the type described herein. The illustrated circuit is contained in each of the pulse generators 146 (shown in FIG. 3) or each of the pulse sequence generators 146 (shown in FIG. 18). The circuit comprises several switches (e.g. transistors, such as MOSFETs, for example) S1-S5, which are connected between an output node and several voltage rails −V1, −V2, Ground, +V1, +V2. Several control lines C1-C5 control the operation of the respective switches S1-S5 in order to selectively put the output node in communication with the respective voltage rails. The control lines C1-C5 are controlled by digital logic circuits (e.g. the transmitter controller) 152 in order to change the voltage at the output node in accordance with the partial truth table shown in FIG. 13. The circuit of FIG. 12 is therefore capable of generating a multilevel square-wave excitation pulse with at least five separate voltage levels or steps (i.e. −V1, −V2, Ground, +V1, +V2). It goes without saying that the illustrated circuit can be readily modified in order to provide for additional or fewer voltage steps.

Figure 14:
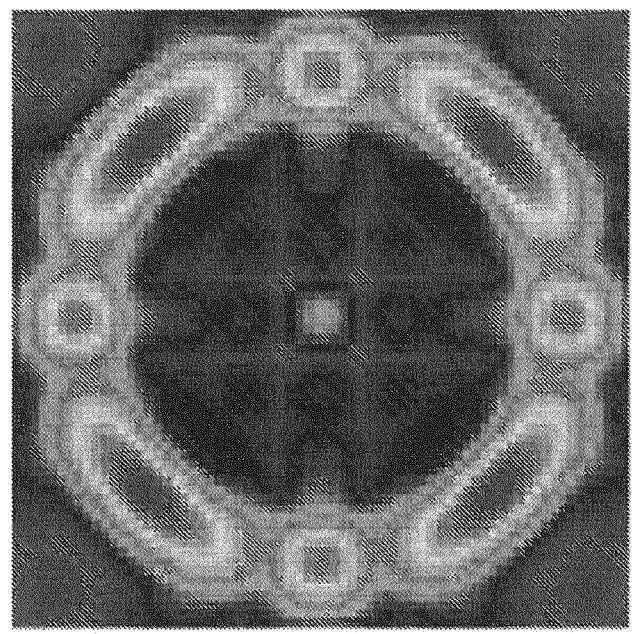
FIG. 14 is a simulated image of the output of an exemplary ultrasonic transducer array if fully analog excitation signals are used for controlling the ultrasonic transducer array in order to generate an arbitrary sound field.
Figure 15:
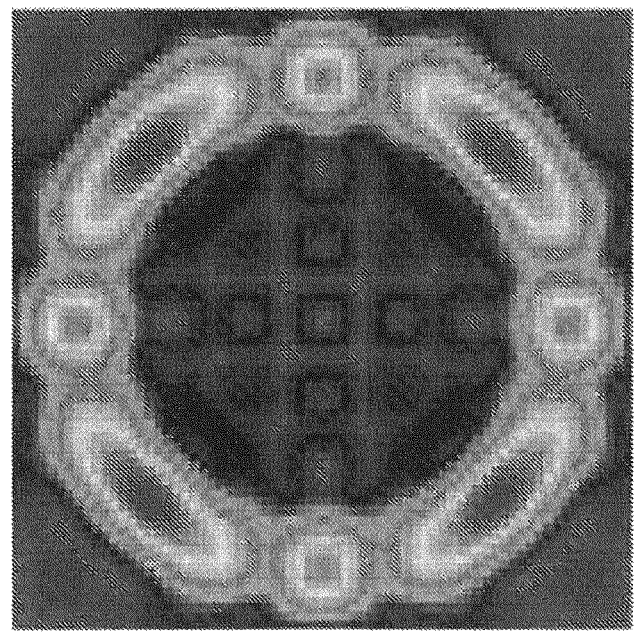
FIG. 15 is a simulated image of the output of an exemplary ultrasonic transducer array if multilevel square-wave excitation pulses are used for controlling the ultrasonic transducer array in order to generate an arbitrary sound field.

A simulated exemplary acoustic holography output generated by the system 100 when fully analog excitation pulses are being used is shown in FIG. 14. As shown in FIG. 15, there is a high degree of similarity in the output of the system 100 when multilevel square-wave excitation pulses with up to eleven steps are used instead. Of course, the degree of similarity can be optimized by using additional or fewer steps, as described above.

Figure 16:
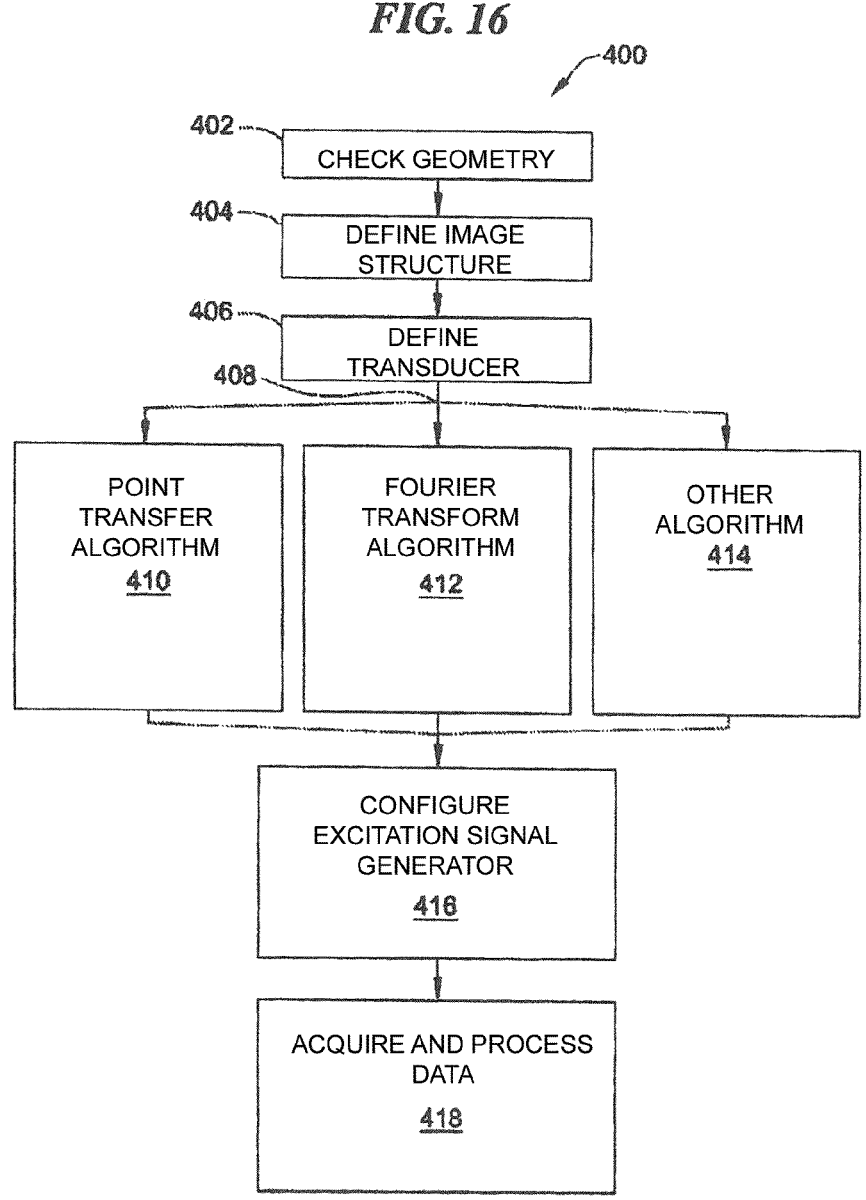
FIG. 16 is a flow diagram illustrating an exemplary method for imaging for a physical object using ultrasonic holography.

FIG. 16 illustrates an exemplary method 400 for realizing the imaging by means of a method according to embodiments of the invention based on ultrasonic holography. First, the geometry of the physical object 101 to be inspected is measured and the corresponding data are stored in the system 100 at step 402. Accordingly, regions of the physical object 101 are identified of which it is known from history that they tend to have defects in similar physical objects, which enables a desired image of the physical object to be defined in step 404. Once the geometry of the physical object 101 to be inspected and the desired image structure are known, a configuration of the ultrasonic transducer for obtaining the desired acoustic image is defined in step 406. For example, a size of a panel of piezo-electric elements is selected, a suitable sound burst pulse frequency is selected and an individual size of the piezo-electric element and the geometry is selected.

In step 408, a suitable data processing algorithm for use in converting the image structure in step 404 into a series of bursts having a predefined individual configuration is selected with respect to each ultrasonic transducer element 110. Several available data processing algorithms adapted from optical imaging systems known to persons skilled in this art can be used, including a point transfer algorithm 410, a Fourier transform algorithm 412 or other available algorithms 414 for performing digital holography.

The selected data processing algorithm is used for transforming the defined image structure into instructions that are to be transmitted to the waveforming portion 141. For example, the use of a point transfer algorithm 410 contains the transformation of a defined image structure 404 into a field of points in space, the definition of gray scale values for each point in the field, the calculation of a desired amplitude and phase for waveforms to be emitted, which affect each point in the field, and the providing of the coherent addition of contributions from each image point in order to determine the amplitude and phase of each burst from each individual element. The result of the use of the point transfer algorithm 410 results in the definition of an interference pattern which the ultrasonic transducer array 102 generates during the emission of the defined series of bursts. The use of a Fourier transform algorithm 412 can comprise the transformation of a defined image pattern into a field of points in space and the calculation of a Fourier transform of the defined image, wherein optical Fourier transform is used in order to transmit the Fourier transform of the defined image onto the ultrasonic transducer array 102. The result of the use of the point transfer algorithm 410 or of the Fourier transform algorithm 412 results in the definition of an interference pattern which the ultrasonic transducer array 102 generates during the emission of the defined series of bursts, which then interferes with the real acoustic image.

Once the series of ideal bursts is defined, multilevel square-wave excitation pulses are calculated in step 416, which cause the ultrasonic transducer array 102 to generate the ideal bursts or in order to generate bursts that are very similar to the ideal bursts. In particular, the pulse generators 146 of the waveforming portion 141 are configured or programmed in such a way that they generate multilevel square-wave excitation pulses, which are rectangular approximations of a corresponding fully analog excitation pulse, when the system operates in the first operating mode. When the system operates in the second operating mode, the pulse generators 146 are configured or programmed so as to generate fully analog excitation pulses. The operating mode can be selected by the user or can be automatically selected by the system 100.

After a desired algorithm for processing the data to be acquired has been selected in step 408, and after the waveforming portion 141 is configured in step 416 so as to generate the desired excitation signals, the actual data acquisition proceeds in step 418. During the data acquisition in step 418, one or more several ultrasonic pulses is/are emitted by the ultrasonic transducer array 102, bursts are emitted by different ultrasonic transducer elements 110, which vary as regards the amplitude, duration and/or time shift, depending on the suitability for the geometry of the physical object 101 that is being mapped and the predetermined desired image structure. The reflected ultrasonic waves are received by the ultrasonic transducer elements 110, and unprocessed waveform signals are stored in the storage elements 161. The unprocessed signals are amplified and preprocessed in the analog processing portion 107 of the system 100 in order to generate A-scans, as described. Once they have been generated, A-scans can be evaluated using known ultrasonic imaging methods in order to develop visualizations of a higher order, such as B-scans, for example. As used herein, "B-scans" relates to a fully developed three-dimensional color scale image of an object. Data contained in A-scan can also be used in alarm systems by comparison with predefined threshold values. And finally, unprocessed signals and processed signals obtained during an imaging session can be exported by the system 100 for data storage or further evaluation.

Even though various methods disclosed herein can be shown with reference to flow diagrams or process diagrams, it should be noted that a sequence of method steps implied by such flow diagrams or process diagrams or the description thereof is not interpreted as being limiting for the method for carrying out the steps in this order. Rather, the various steps can be carried out by every method disclosed herein in a multitude of sequences. Because the illustrated flow diagrams and process diagrams are merely exemplary embodiments, various other methods comprising additional steps or comprising fewer steps than shown are therefore also within the scope of the present disclosure.

Some embodiments of the systems and methods disclosed herein produce a series of advantages and/or technical effects. In contrast to known ultrasonic holography systems, the ultrasonic holography systems described herein are configured in some embodiments in such a way, for example, that they generate and transmit non-homogeneous sound fields irrespective of the ultrasonic transducer configuration. The ultrasonic holography imaging system described herein in some embodiments enable the generation of real acoustic three-dimensional images that enable the generation of a virtual image with an improved resolution and differentiation characteristics, compared with known ultrasonic holography imaging system that operate without the generation of a real acoustic image. Furthermore, the ultrasonic holography imaging systems described herein in some embodiments provide for an improved imaging that can deal with the shape and the structure of the physical object that is currently being imaged. In contrast to known ultrasonic holography imaging system, the systems and methods described herein in some embodiments also provide for the generation of ultrasonic waveforms that are emitted by separate ultrasonic transducers in an ultrasonic transducer array in such a way that at least two of the several ultrasonic waveforms differ from one another by the variation of at least one element from among amplitude, frequency, time shift and phase or modulation of the same. Furthermore, the systems and methods described herein in some embodiments provide for the excitation of an ultrasonic transducer array using multilevel square-wave excitation pulses that can be generated with a reduced complexity, costs and/or energy consumption as compared with fully analog excitation pulses, and that are less limited with regard to voltage, speed and flexibility of ASIC implementation.

In a particular of carrying out the method does not work with a particular insonification angle that is being varied electronically from pulse to pulse. Rather, it is possible to insonify by means of a two-dimensional array 102 of ultrasonic transmitting transducers 110 a pulsed ultrasonic field, which forms a line-like focus in a region of interest in the train wheel, into the train wheel 102 to be tested.

Reception and evaluation is then carried out by means of the individual ultrasonic receiving transducers of an ultrasonic receiving transducer array, as described in the reception-specific features b. of claim 1 and of claim 3. Also in this case, the application of the reception processing rules can be done, in accordance with the "paint brush method".

Four exemplary embodiments of the method according to embodiments of the invention are presented with reference to the FIGS. 19 to 26. In all four exemplary embodiments, a train wheel is being tested with a device according to embodiments of the invention, in which the test probes used are configured to be stationary and in which the train wheel is rotated about the axis of symmetry underneath the test probes. In particular, the testing device according to embodiments of the invention comprises for this purpose a driving mechanism, which is not shown in the Figures, with which the wheel is set in a rotary movement.

Figure 19:
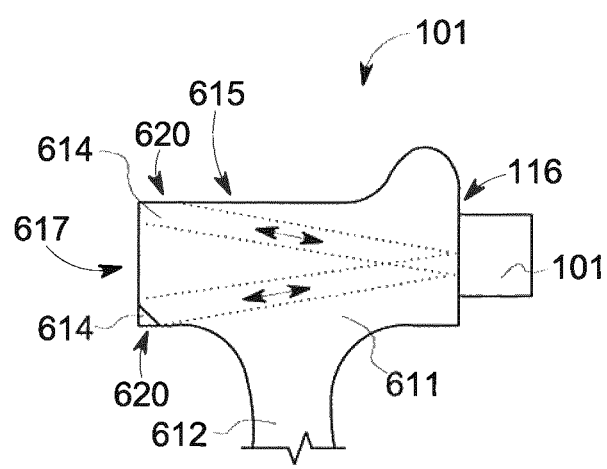
FIG. 19 is a schematic representation of a section through the wheel rim of a train wheel to be tested, for illustrating a first exemplary embodiment.

FIG. 19 schematically shows a section through the wheel rim 611 of a train wheel 610 to be tested. The wheel rim 611 forming the running surface 615 is shown. The wheel rim 611 transitions continuously into the wheel disk 612. FIG. 19 shows a first application example of the method according to embodiments of the invention, by means of which the simultaneous testing of two regions of interest 614 located at outer end faces 617 of the wheel rim 611 can be tested. For this purpose, a test probe 111, which comprises a two-dimensional array of individually controllable ultrasonic transducers (not shown), is placed on the inner end face 616 of the wheel rim 611. By suitably controlling these ultrasonic transducers in accordance with the method according to embodiments of the invention, a pulsed ultrasonic field is generated which simultaneously forms one line-like focus, respectively, in both of the regions of interest 614 shown in FIG. 19.

Figure 20:
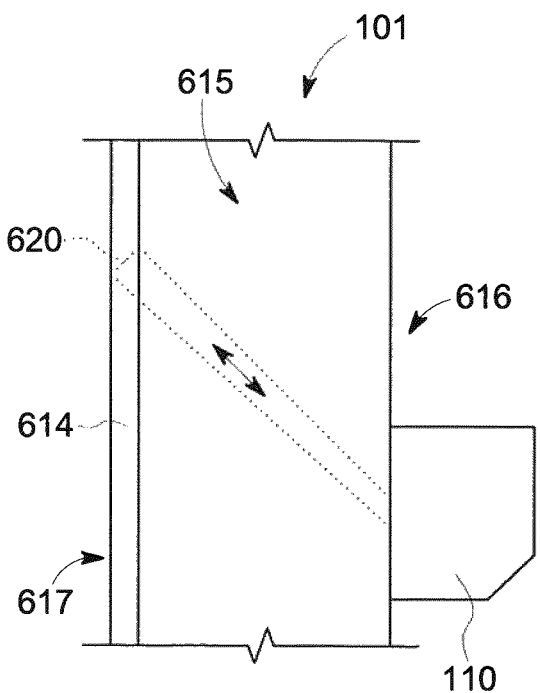
FIG. 20 is a top view of the wheel rim from FIG. 19 for illustrating the first exemplary embodiment.

As is apparent from FIG. 20, which shows a section-like top view of the running surface 615 of the train wheel 610, the work is done with an insonification angle of about 45° against the inner end face 616 of the wheel rim 611 on which the test probe 109 is placed. Because in practice, cracks primarily occur in the regions of interest 614 shown, which are oriented in the radial direction and extend perpendicularly from the outer end face 617 of the wheel rim into the volume of the wheel rim 611, the ultrasonic test probe used in this case for transmission can also be used as a receiving test probe. During receiving, the individually controllable ultrasonic transducers 110, which are contained in the test probe, of the transmitting array 102 are used as echo receivers, with the received echo signals being individually digitized and temporarily stored for each receiving transducer. The echo signals thus obtained are then processed further, as this is explained in connection with embodiments of the method according to embodiments of the invention, for example.

Figure 21:
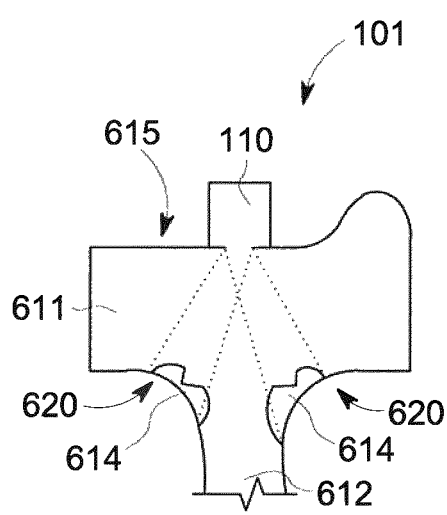
FIG. 21 is a schematic representation of a section through the wheel rim of a train wheel to be tested, for illustrating a second exemplary embodiment.
Figure 22:
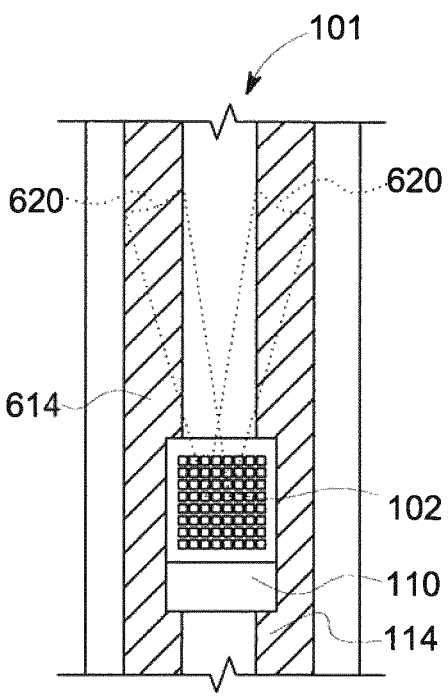
FIG. 22 is a top view of the wheel rim from FIG. 21 for illustrating the second exemplary embodiment.

FIG. 21 shows another exemplary embodiment of the method according to embodiments of the invention, which serves for detecting transversal cracks in the transition between the wheel rim 611 and the wheel disk 612. The corresponding regions of interest 614 are apparent from FIG. 21. In this exemplary embodiment, an ultrasonic test probe 109 in accordance with the exemplary embodiment of FIGS. 19 and 20 is placed on the running surface 615 of the wheel rim 611. Insonification is done also in this case with an insonification angle 45° against the normal of the running surface 615, so that the transmitting test probe 109 can simultaneously function as a receiving test probe also in this exemplary embodiment, as was already explained in connection with the previous exemplary embodiment. By means of the method according to embodiments of the invention, the transmitting test probe 109 is now controlled in such a way that focus lines 620, which are oriented in the radial direction and substantially extend in each case through the entire regions of interest 614, form in the transition region to be inspected between the wheel rim 611 and the wheel disk 612 in the respective regions of interest 614, both on the outwardly oriented surface of the train wheel 610 as well as on the inwardly oriented surface of the train wheel 610. The application of the method according to embodiments of the invention permits the generation of a pulse ultrasonic field which has a focus line simultaneously on the inner and on the outer surface of the train wheel 610. Furthermore, it is possible to keep the amplitude low in the transition region located between the regions of interest 614 and to concentrate the sound energy available for generating flaw echoes substantially on the regions of interest 614.

FIG. 22 again shows the testing configuration according to FIG. 21 in a top view of the running surface 615 of the wheel rim 611 of the train wheel 610 to be tested. The transmitting test probe 109 is placed on the running surface 615. The regions of interest 614 extending in the transition regions of the wheel rim 611 to the wheel disk 612 near the surface and on both sides of the train wheel 610 are indicated in a hatched manner in FIG. 22. Moreover, the focus lines 620 forming in the regions of interest 614 are shown.

Figure 23:
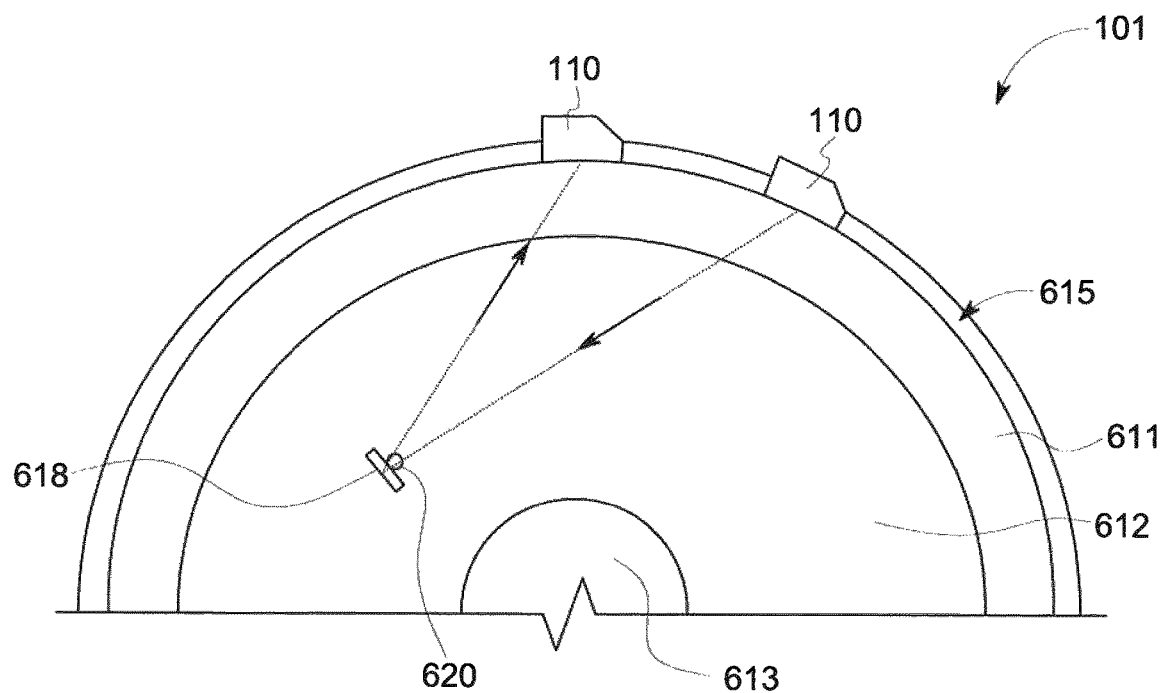
FIG. 23 is a partial side view of a train wheel to be tested, for illustrating a third exemplary embodiment.
Figure 24:
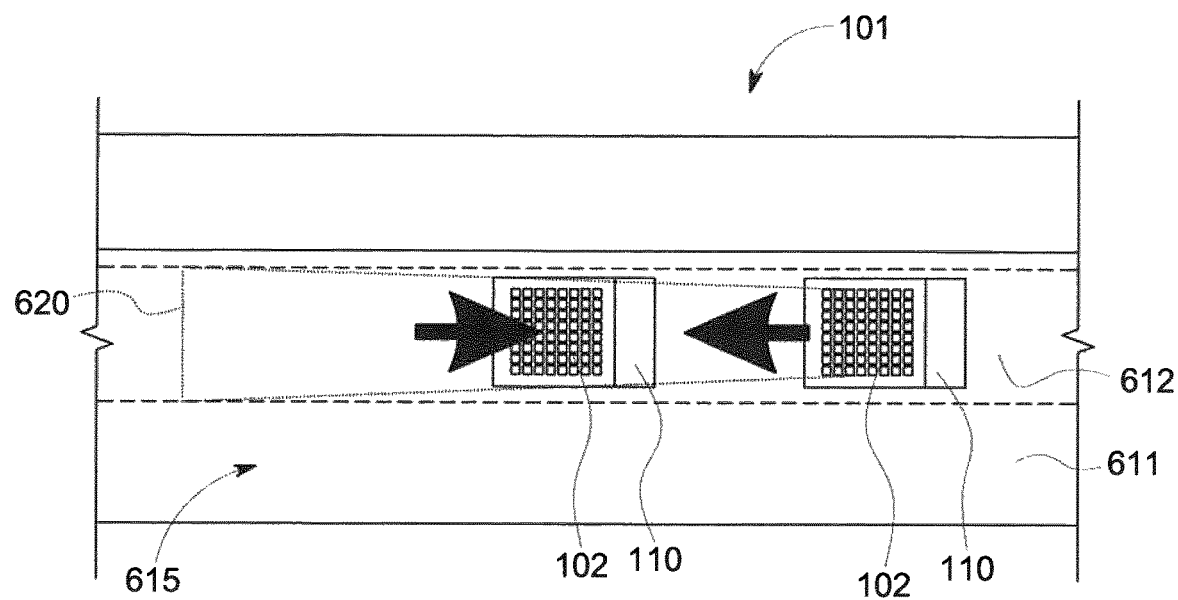
FIG. 24 is a top view of the wheel rim of the train wheel from FIG. 23 for illustrating the third exemplary embodiment.

Another embodiment of the method according to embodiments of the invention is apparent from the FIGS. 23 and 24, which serves for detecting radially oriented flaws 618 in the wheel disk 612. In order to detect them, a tandem configuration of two phased array test probes 109 of the type already known from the last two exemplary embodiments is used in the work. Of these ultrasonic test probes 109, a first test probe 109 is used as a transmitting test probe and a second test probe 109 is used as a receiving test probe. Both ultrasonic test probes 109 are placed on the running surface 615 of the wheel rim. Through the wheel rim 611, at an insonification angle other than 0°, the transmitting test probe 109 insonifies into the wheel disk 612, where a line-like focus 620, which is oriented in the direction of the axis of symmetry of the train wheel 610, forms at a predetermined position. The extent of this line-like focus 620 is apparent from FIG. 24, which shows a top view of the running surface 615 of the train wheel 610 with the ultrasonic test probes 109 placed thereon. The method according to embodiments of the invention permits the insonification into the wheel disk 612 of an ultrasonic field whose line-like focus virtually extends over the entire thickness of the wheel disk 612.

Figure 25:
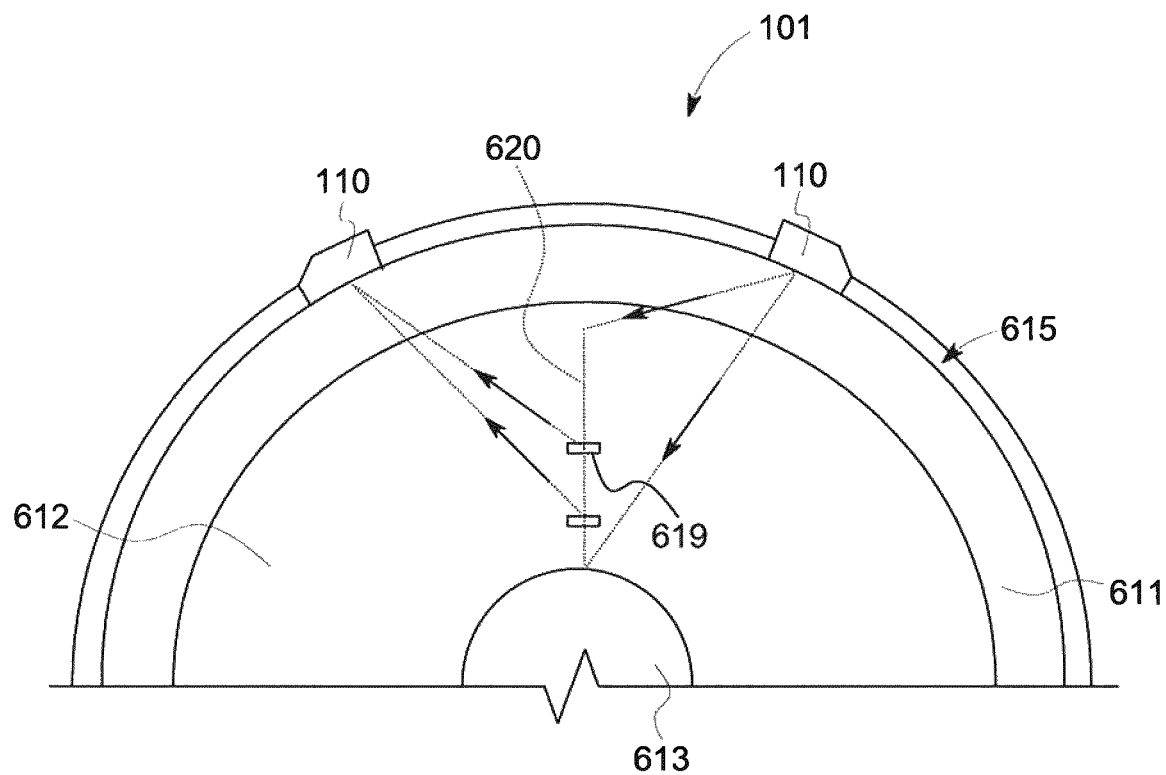
FIG. 25 is a partial side view of a train wheel to be tested, for illustrating a fourth exemplary embodiment.
Figure 26:
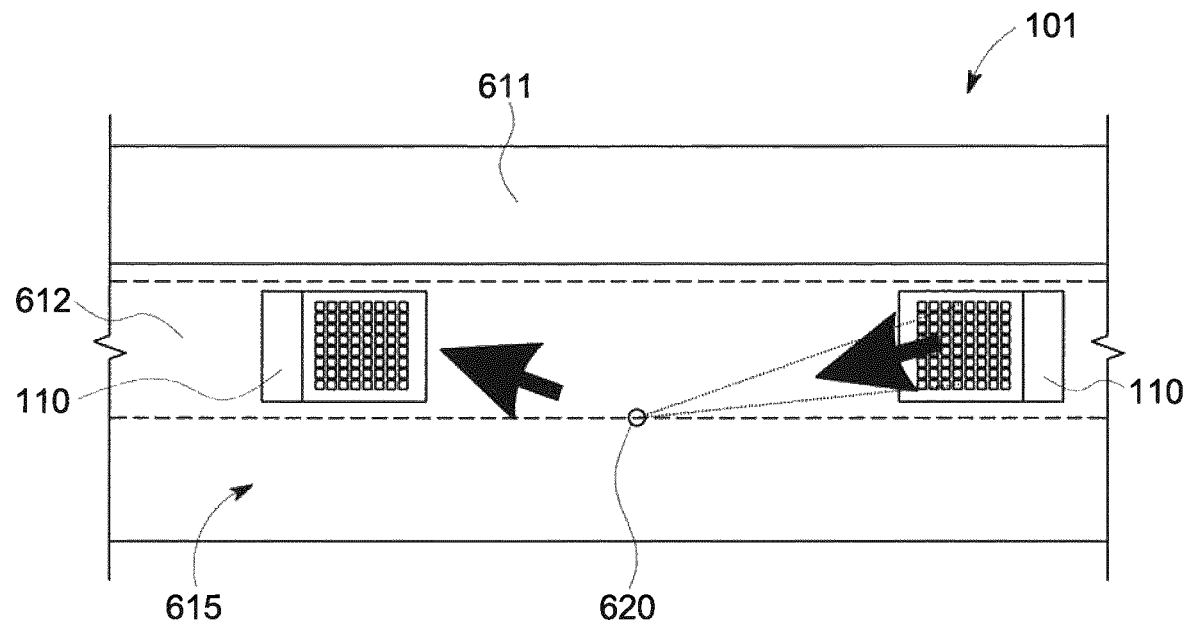
FIG. 26 is a top view of the wheel rim of the train wheel from FIG. 25 for illustrating the fourth exemplary embodiment.

Finally, FIGS. 25 and 26 show a fourth exemplary embodiment for an application of the method according to embodiments of the invention to the testing of the wheel disk 612 of a train wheel 610 for tangentially oriented incipient cracks, i.e. cracks that start from the outer surface of the wheel disk 612. A V-shaped configuration with separately formed transmitting and receiving test probe 109 are used in the work. Details regarding this configuration are apparent from EP 1 087 229 A1 already mentioned in the introductory part. The transmitting test probe 109, whose structure, just like the one of the receiving test probe 109, corresponds to the structure from the above-described exemplary embodiments, insonifies an ultrasonic field through the wheel rim 611 into the wheel disk 612 using the method according to embodiments of the invention, in such a way that a radially extending focus line 620 forms which directly adjoins the outer surface of the wheel disk 612 but lies within the material of the wheel disk 612. Echo signals emanating from tangentially oriented flaws 619 that are located within this surface of the wheel disk 612 are recorded by means of the separately formed ultrasound receiving test probe, as is shown by way of example in FIG. 25. FIG. 26 again shows a view of the running surface 615 of the wheel rim 611 of the train wheel 610 to be tested, on which both the ultrasound transmitting test probe as well as the ultrasound receiving test probe are placed.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for detecting a flaw in a region of interest in a train wheel that is rotatable about an axis of rotation, comprising:
    providing an array of individually controllable ultrasonic transmitting transducers for insonifying an ultrasonic field;
    moving the array of individually controllable ultrasonic transmitting transducers relative to the train wheel in a substantially circular manner about the axis of rotation;
    controlling each of the ultrasonic transmitting transducers with a specific transient excitation signal, each transient excitation signal being generated based on an ultrasonic transmitting transducer-specific stored digital transient excitation function;
    receiving, by an array of individually controllable ultrasonic receiving transducers, resulting echo signals from the test object, with each ultrasonic receiving transducer providing an analog time-resolved echo signal;
    transducer-specific digitizing of the time-resolved analog echo signals;
    temporarily storing the time-resolved, transducer-specific, digitized echo signals in the form of an echo signal set; and
    correlating the temporarily stored echo signal set with a single ultrasonic pulse insonified into the train wheel.

2. The method according to claim 1, wherein the ultrasonic transmitting transducers are controlled such that a line-like focus of the insonified ultrasonic field forms in the region of interest, or a two-dimensionally extending focus extending along the sound propagation direction of the ultrasonic field.

3. The method according to claim 1, comprising:
    applying a plurality of different reception processing rules to the echo signal set, wherein a reception processing rule is characterized by at least the following reception processing parameters:
        the number and identity of the ultrasonic receiving transducers whose echo signals are being taken into account in the reception processing rule;
        individual phase shifts applied to the echo signals taken into account in the reception processing rule; and
        time frames in which the echo signals lie that are to be taken into account in the reception processing rule.

4. The method according to claim 3, wherein the applied reception processing rules differ in at least one of the reception processing parameters.

5. The method according to any of claim 1, comprising:
    predefining a sound field geometry, which is adapted to the region of interest of the train wheel and to the testing task to be carried out, of the ultrasonic field insonified into the train wheel,
    determining the ultrasonic transmitting transducer-specific digital transient excitation functions that are suitable for generating an ultrasonic field in the train wheel with the predefined sound field geometry by the array of ultrasonic transmitting transducers.

6. The method according to claim 5, wherein the suitable ultrasonic transmitting transducer-specific digital transient excitation functions are determined based on a point transfer algorithm or a Fourier transform algorithm.

7. The method according to claim 1, wherein a transducer-specific coding is additionally modulated onto the ultrasonic transmitting transducer-specific transient excitation signals.

8. The method according to claim 7, wherein the high-frequency modulation can be detected on the receiving side and the high-frequency modulation is used for associating the detected transducer-specific echo signal with the respective ultrasonic transmitting transducer.

9. The method according to claim 1, wherein the ultrasonic transmitting transducer-specific transient excitation functions are generated by a series of multilevel square wave signals.

10. The method according to claim 3, wherein the reception processing rules represent an implementation of the paint brush method or of the dynamic depth focusing method.

11. The method according to claim 1, wherein the circular movement is produced by a rotation of the rotatably mounted train wheel.

12. The method according to claim 1, wherein the ultrasonic field is insonified as follows:
    through the wheel rim into the wheel disk;
    through an end face of the wheel disk into the wheel hub or the transition zone between the wheel disk and the wheel hub;
    through an end face of the wheel rim into the wheel rim; or
    through the running surface into the wheel rim or into the transition zone between the wheel rim and the wheel disk.

13. The method according to claim 1, comprising generating a two-dimensional or three-dimensional image of at least the region of interest of the train wheel, in which the flaw indications found are registered in a spatially resolved manner.

14. The method according to claim 13, wherein characteristics of the flaw indications found are represented in a graphically coded manner.

15. A testing device for the detection of a flaw, in a region of interest in a train wheel, comprising:
- a transmitting array of individually controllable ultrasonic transmitting transducers for insonifying an ultrasonic field into a train wheel;
- a controller configured for controlling the ultrasonic transmitting transducers for insonification of the ultrasonic field into the train wheel;
- a receiving array of individually controllable ultrasonic receiving transducers for receiving resulting echo signals from the train wheel, with each ultrasonic receiving transducer providing an analog time-resolved echo signal;
- a generator for generating a circular relative movement of the ultrasonic transmitting array, the ultrasonic receiving array and the train wheel about a common axis of rotation;
- a transducer-specific digitizer for digitization of the time-resolved analog echo signals; and
- a temporary storage for storing the time-resolved, transducer-specific, digitized echo signals in the form of an echo signal set;

wherein the controller is configured to:
- control each ultrasonic transmitting transducer of the transmitting array with a specific transient excitation signal, respectively, each transient excitation signal being generated based on an ultrasonic transmitting transducer-specific stored digital transient excitation function,
- digitize the time-resolved analog echo signals based on transducer-specific digitization;
- temporarily store the time-resolved, transducer-specific, digitized echo signals in the form of an echo signal set; and
- correlate the temporarily stored echo signal set with a single ultrasonic pulse insonified into the train wheel.

16. The device according to claim 15, wherein the controller is configured to additionally modulate a transducer-specific coding onto the ultrasonic transmitting transducer-specific transient excitation signals.

17. The device according to claim 15, wherein the controller is configured for controlling the ultrasonic transmitting transducers in such a way that a line-like focus of the insonified ultrasonic field forms in the region of interest.

18. The device according to claim 15, comprising:
- an evaluator configured for applying a plurality of different reception processing rules to the echo signal set, a reception processing rule being characterized by at least the following reception processing parameters:
  - the number and identity of the ultrasonic receiving transducers whose echo signals are being taken into account in the reception processing rule;
  - individual phase shifts applied to the echo signals taken into account in the reception processing rule; and
  - time frames in which the echo signals lie that are to be taken into account in the reception processing rule.

19. The device according to claim 18, wherein the applied reception processing rules differ in at least one of the reception processing parameters.

20. The device according to claim 18, wherein the reception processing rules represent an implementation of the paint brush method or of the dynamic depth focusing method.

21. The device according to claim 18, wherein the evaluator is configured for detecting high-frequency modulation and using the high-frequency modulation for associating the detected transducer-specific echo signal with the respective ultrasonic transmitting transducer.

22. The device according to claim 15, comprising a generator for generating a series of multilevel square wave signals based on which the ultrasonic transmitting transducer-specific transient excitation functions are generated.

23. The device according to claim 15, comprising a rotating device for a rotation of the rotatably mounted train wheel.

24. The device according to claim 15, comprising a retaining mechanism for the ultrasonic transmitting array or/and the ultrasonic receiving array for mechanically retaining the respective array, so that the respective array comes to rest against:
- one of the end faces or the running surface of the wheel rim;
- the end face of the wheel disk; or
- the wheel hub.

25. The device according to claim 24, wherein the retaining mechanism is configured to support both the ultrasonic transmitting array and the ultrasonic receiving array.

26. The device according to claim 15, comprising a visualizer configured to generate a two-dimensional or three-dimensional image of the train wheel, in which flaw indications found are registered in a spatially resolved manner.

27. The device according to claim 26, wherein the visualizer is configured for presenting characteristics of the flaw indications found in a graphically coded manner in the generated two-dimensional or three-dimensional image.

* * * * *